(12) United States Patent
Sawai et al.

(10) Patent No.: US 10,324,362 B2
(45) Date of Patent: Jun. 18, 2019

(54) OPTICAL UNIT AND PROJECTOR THEREWITH

(71) Applicant: Konica Minolta, Inc., Tokyo (JP)

(72) Inventors: Yasumasa Sawai, Yamatotakada (JP); Masahiro Terada, Nishinomiya (JP); Masayuki Imaoka, Izumiotsu (JP); Sadanobu Imamura, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/026,384

(22) Filed: Jul. 3, 2018

(65) Prior Publication Data

US 2019/0011813 A1 Jan. 10, 2019

(30) Foreign Application Priority Data

Jul. 4, 2017 (JP) ................................ 2017-131249

(51) Int. Cl.
| | |
|---|---|
| G03B 21/00 | (2006.01) |
| G02B 27/09 | (2006.01) |
| G02B 27/10 | (2006.01) |
| G02B 27/12 | (2006.01) |
| G03B 21/28 | (2006.01) |

(52) U.S. Cl.
CPC ....... *G03B 21/008* (2013.01); *G02B 27/0955* (2013.01); *G02B 27/0972* (2013.01); *G02B 27/1006* (2013.01); *G02B 27/126* (2013.01); *G03B 21/28* (2013.01)

(58) Field of Classification Search
CPC .... G03B 21/005; G03B 21/008; G03B 21/28; G03B 21/208; H04N 9/315; H04N 9/3102; H04N 9/3152
See application file for complete search history.

(56) References Cited

U.S. PATENT DOCUMENTS

| | | | | |
|---|---|---|---|---|
| 9,529,247 B2* | 12/2016 | Katou | ..................... | G02B 27/26 |
| 9,549,171 B2* | 1/2017 | Huang | ................. | H04N 9/3129 |
| 2002/0180934 A1* | 12/2002 | Shimizu | ............... | H04N 5/7458 |
| | | | | 353/30 |
| 2005/0024594 A1* | 2/2005 | Kumai | ................... | G03B 21/28 |
| | | | | 353/33 |
| 2012/0170000 A1* | 7/2012 | Imaoka | .................. | G02B 27/26 |
| | | | | 353/20 |
| 2012/0170001 A1* | 7/2012 | Sawai | .................. | G02B 27/285 |
| | | | | 353/20 |

(Continued)

FOREIGN PATENT DOCUMENTS

JP 2007-025287 A 2/2007

*Primary Examiner* — Sultan Chowdhury
(74) *Attorney, Agent, or Firm* — Osha Liang LLP

(57) ABSTRACT

In an optical unit, illumination light is directed to a plurality of digital micromirror devices that produce projection light by modulating the illumination light on an image display surface according to an image signal. The optical unit emits the projection light produced by the digital micromirror devices. The optical unit includes: a reflector having an illumination light reflecting face on which the illumination light is reflected; and a prism unit composed of a plurality of first prisms. The reflected illumination light enters the prism unit via a first face of a most emergence-side first prism among the first prisms and the projection light exits via the first face.

14 Claims, 29 Drawing Sheets

(56) References Cited

U.S. PATENT DOCUMENTS

| | | | | |
|---|---|---|---|---|
| 2013/0242272 A1* | 9/2013 | Baba | .................... | G03B 21/008 353/81 |
| 2016/0116831 A1* | 4/2016 | Haga | ..................... | H04N 9/317 353/69 |
| 2016/0216599 A1* | 7/2016 | Chien | ................ | G03B 21/2066 |

* cited by examiner

OPTICAL UNIT AND PROJECTOR THEREWITH

CROSS REFERENCE TO RELATED APPLICATIONS

The entire disclosure of Japanese Patent Application No. 2017-131249, filed on Jul. 4, 2017, is incorporated herein by reference in its entirety.

BACKGROUND

1. Technical Field

The present invention relates to an optical unit that receives illumination light and emits projection light reflected from a digital micromirror device, and relates also to a projector provided with such an optical unit.

2. Description of the Related Art

A projector incorporating a conventional optical unit is disclosed in Patent Document 1 identified below. This projector includes a light source, an optical unit, a plurality of digital micromirror devices, and a projection lens. The optical unit includes a total reflection light separation prism and a cross dichroic prism. From the projection side (emergence side) toward the digital micromirror devices, the total reflection light separation prism and the cross dichroic prism are arranged in this order.

The digital micromirror device is a reflective image display element in a rectangular shape as seen in a plan view, and has an image display surface composed of a plurality of minute micromirrors. The digital micromirror device forms an image by producing projection light through intensity modulation on illumination light through ON/OFF control of the inclination of the faces of the micromirrors. Each micromirror pivots about a pivot axis of the digital micromirror device so that it has different angles of inclination in an ON state and in an OFF state.

The total reflection light separation prism is composed of two prisms; one prism has an emergence face, and the other prism has an entrance face and a total reflection face as well as a protruding portion that protrudes toward the emergence face in the emergence direction. Part of the total reflection face is provided in the protruding portion, and white illumination light that has entered the total reflection light separation prism via the entrance face is totally reflected toward the cross dichroic prism. The emergence face is disposed to face the projection lens, and the projection light produce by the digital micromirror devices is emitted toward the projection lens.

The cross dichroic prism has two mutually perpendicular dichroic coat faces; it separates the white illumination light totally reflected from the total reflection face in the total reflection light separation prism into a red, a green, and a blue component, and directs these to the digital micromirror devices respectively. The cross dichroic prism also integrates together red, green, and blue ON-light (projection light) reflected from micromirrors in the ON state in the digital micromirror devices, and emits the color-integrated ON-light toward the total reflection light separation prism. The most emergence face-side face of the cross dichroic prism is parallel to the emergence face, and is perpendicular to the optical axis of the color-integrated ON-light.

In the projector structured as descried above, the white illumination light emitted from the light source and entered the total reflection light separation prism is totally reflected on the total reflection face in it, and then exits from the total reflection light separation prism to enter the cross dichroic prism. The illumination light entered the cross dichroic prism undergoes color separation, so that the red, green, and blue components of the illumination light are emitted to the different digital micromirror devices respectively.

The red, green, and blue ON-light reflected from micromirrors in the ON state in the digital micromirror devices enters the cross dichroic prism to undergo color integration, and is emitted toward the total reflection light separation prism. The color-integrated ON-light passes through the total reflection face in the total reflection light separation prism, and then exits via the emergence face, so that it then passes through the projection lens. Thus, a color image is projected.

Patent Document 1: Japanese Patent Application published as No. 2007-25287 (pages 5 and 6; FIGS. 1 and 3).

In projectors, it is common to move the projection lens in the up-down or left-right direction to change the projection position of the projected image. That is, in projectors, it is common to shift the projection lens up and down or left and rightward. Inconveniently, in the conventional optical unit described above, the total reflection light separation prism has a protruding portion that protrudes in the emergence direction, and the projection lens is disposed to the side of the protruding portion, near it. Thus, the movement of the projection lens in the left-right direction is restricted, and the left-right shift amount of the projection lens (that is, the distance over which it can move left and rightward) is reduced. In a case where the protruding portion of the total reflection light separation prism is disposed under the projection lens, near it, the movement of the projection lens in the up-down direction is restricted, and the up-down shift amount of the projection lens (that is, the distance over which it can move up and down) is reduced. This, disadvantageously, results in diminished usability of the optical unit and the projector.

On the other hand, by moving the protruding portion (total reflection face) of the total reflection light separation prism along the most emergence-side face of the cross dichroic prism in the direction away from the projection lens, it is possible to increase the left-right or up-down shift amount of the projection lens. Inconveniently, in this case, of all the rays of the illumination light traveling toward the total reflection light separation prism, some cross dichroic prism-side rays may not reach the entrance face. Such cross dichroic prism-side rays of the illumination light can be made to reach the entrance face by changing the angle of incidence of the illumination light with respect to the entrance face, but then part of the illumination light is not totally reflected on but transmitted through the total reflection face. This reduces the amount of illumination light that is totally reflected on the total reflection face in the total reflection light separation prism, and reduces the amount of illumination light that strikes the digital micromirror devices, disadvantageously resulting in a drop in the amount of projection light.

SUMMARY

One or more embodiments of the present invention provide an optical unit that offers enhanced usability while preventing a drop in the amount of projection light, and to provide a projector provided with such an optical unit.

According to one or more embodiments of the present invention, an optical unit in which illumination light is directed to a plurality of digital micromirror devices that produce projection light by modulating the illumination light on an image display surface according to an image signal so that the optical unit emits, by transmitting, the projection light produced by the plurality of digital micromirror devices includes: a reflecting member having an illumination light reflecting face on which the illumination light is reflected; and a prism unit composed of a plurality of first prisms, the illumination light reflected from the illumination light reflecting face entering via a first face of a most emergence-side first prism, the projection light exiting via the first face. The reflecting member is close to the first face and is disposed so as to protrude from the first face in the projection light exiting direction. The optical axis of the illumination light striking, as incident light, the illumination light reflecting face and the optical axis of the projection light on the first face are disposed on the same plane which is the optical axis plane. A first component vector that is obtained, when a first, outward, normal vector to the first face is projected onto the optical axis plane, by it being projected to be disposed on the same side as the optical axis of the incident light with respect to the optical axis of the projection light points in such a direction that, the farther away from the first face, the farther away from the optical axis of the projection light leaving the first face.

According to one or more embodiments of the present invention, a projector includes: an optical unit as described above; a light source; an illumination optical system that emits illumination light toward the reflecting member in the optical unit; and a projection optical system that projects onto a screen, on an enlarged scale, the image displayed on the digital micromirror devices fitted to the fitting portions.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

Figure 1:
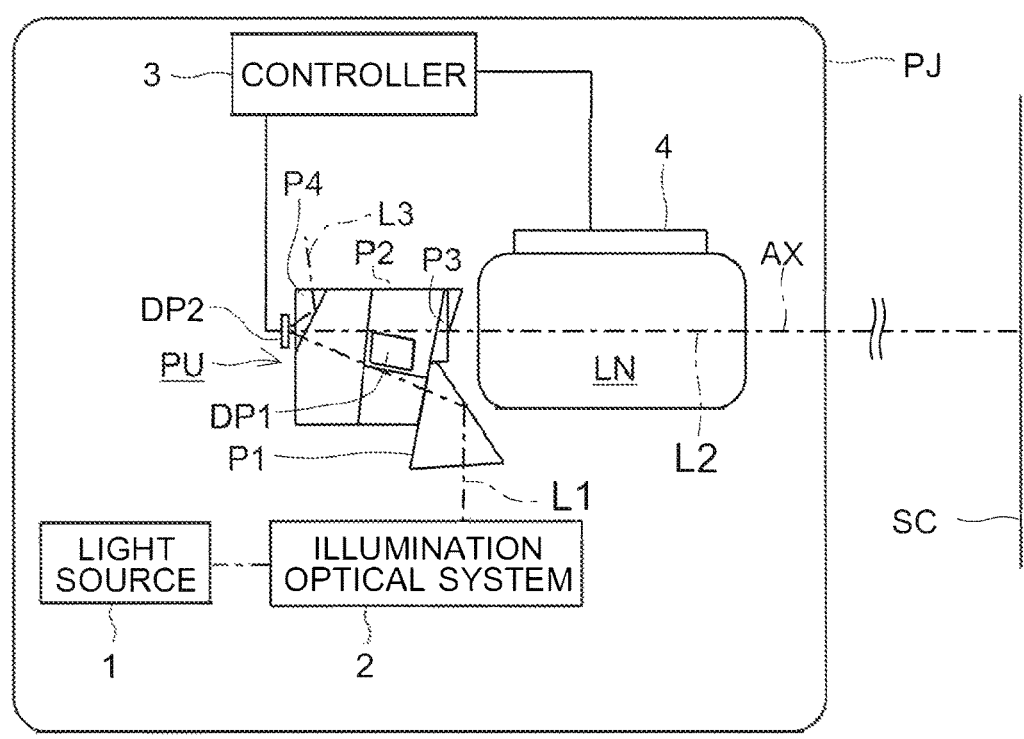
FIG. 1 is an outline configuration diagram of a projector provided with an optical unit according to one or more embodiments of the present invention.

Hereinafter, with reference to the accompanying drawings, one or more embodiments of the present invention will be described. FIG. 1 is an outline configuration diagram of a projector provided with an optical unit according to one or more embodiments. A three-chip (three-panel) projector PJ includes a light source 1, an illumination optical system 2, an optical unit PU, digital micromirror devices DP1, DP2, and DP3 (see also FIG. 4), a projection optical system LN, an actuator 4, and a controller 3.

The light source 1 comprises, for example, an LED, and emits white light. The illumination optical system 2 includes an integrator, a relay lens group, a reflecting mirror, and the like (of which none is illustrated). The illumination optical system 2 converges the light emitted from the light source 1 to emit it, as illumination light L1, toward the optical unit PU.

Figure 2:
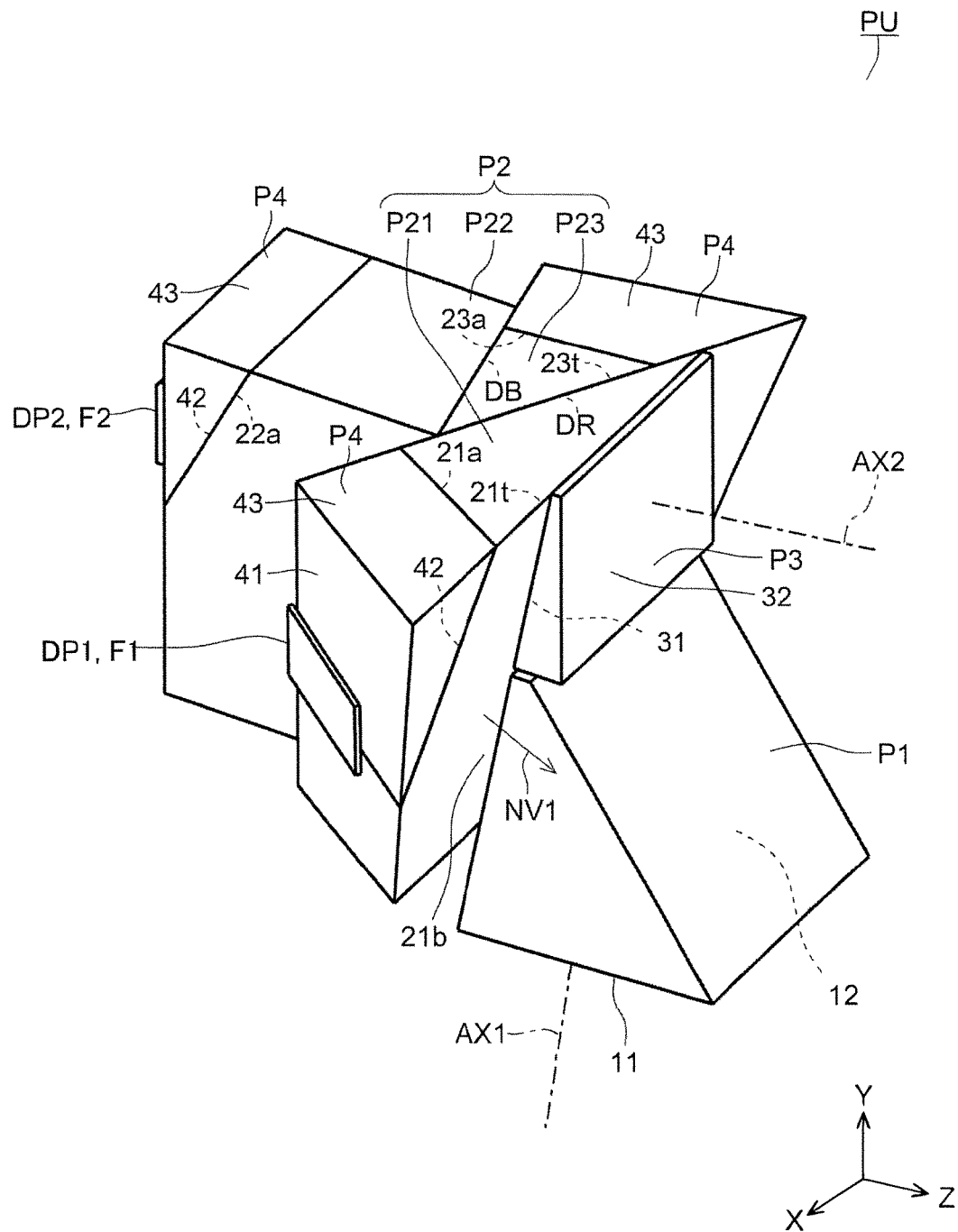
FIG. 2 is a perspective view of the optical unit according to one or more embodiments of the present invention.
Figure 3:
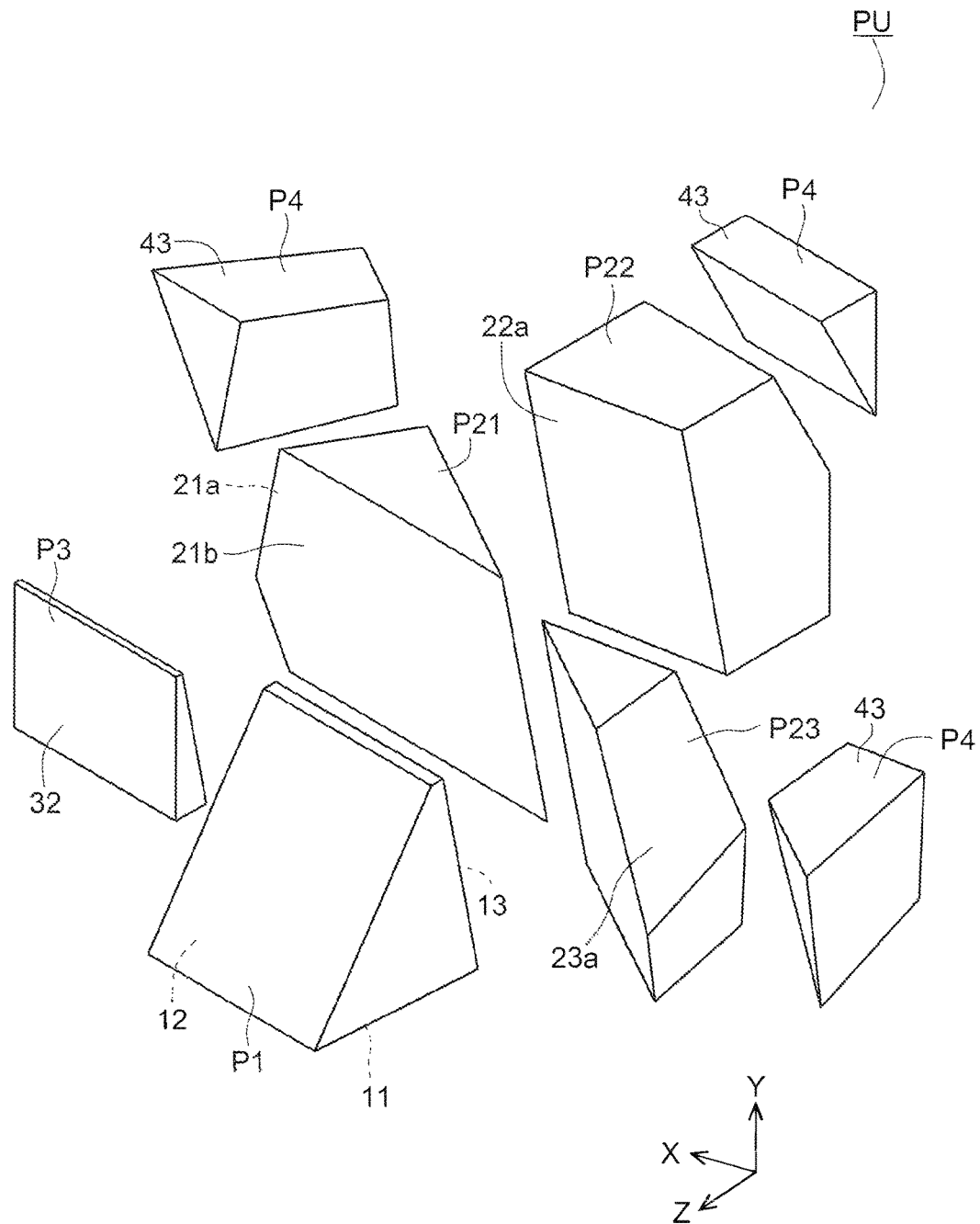
FIG. 3 is an exploded perspective view of the optical unit according to one or more embodiments of the present invention.

FIG. 2 is a perspective view of the optical unit PU. In FIG. 2, the X direction is a direction along the thickness of a prism unit P2. The Z direction is a direction along the optical axis AX2 of projection light reflected from the digital micromirror device DP2. The Y direction is a direction perpendicular to both the X and Z directions. The optical unit PU includes one internal total reflection prism P1 (reflecting member or reflector), one color-separating/integrating prism unit P2 (prism unit), one projection-side prism P3 (second prism), and three OFF-light separating prisms P4 (third prisms). The color-separating/integrating prism unit P2 includes a prism P21 (first prism), a prism P22 (first prism), and a prism P23 (first prism).

As the material for the internal total reflection prism P1, the prisms P21 to P23 in the color-separating/integrating prism unit P2, the projection-side prism P3, and the OFF-light separating prisms P4, for example, glass can be used. In one or more the embodiments under discussion, the internal total reflection prism P1, the prisms P21, P22, and P23, the projection-side prism P3, and the OFF-light separating prisms P4 are formed of glass with the same index of refraction.

The optical unit PU is supported by a support member (unillustrated) inside the projector PJ. The support member is disposed to make contact with the top and bottom faces of the optical unit PU as seen in FIG. 2, and thus holds the optical unit PU from above and below. The optical unit PU has three fitting portions F1, F2, F3 for the fitting of the digital micromirror devices DP1, DP2, and DP3 each in a substantially rectangular shape as seen in a plan view. The fitting portions F1, F2, F3 are, for example, metal frames, and are provided to correspond to the prisms P21, P22, and P23 respectively.

As will be described later, the optical unit PU receives the illumination light L1 via the internal total reflection prism P1, and emits projection light (ON-light, which will be described later) reflected from the digital micromirror devices DP1, DP2, and DP3 toward the projection optical system LN. In the following description, the digital micromirror devices DP1 to DP3 are occasionally referred to collectively as "digital micromirror devices DP". The optical unit PU and the digital micromirror devices DP will be described in detail later.

Figure 5:
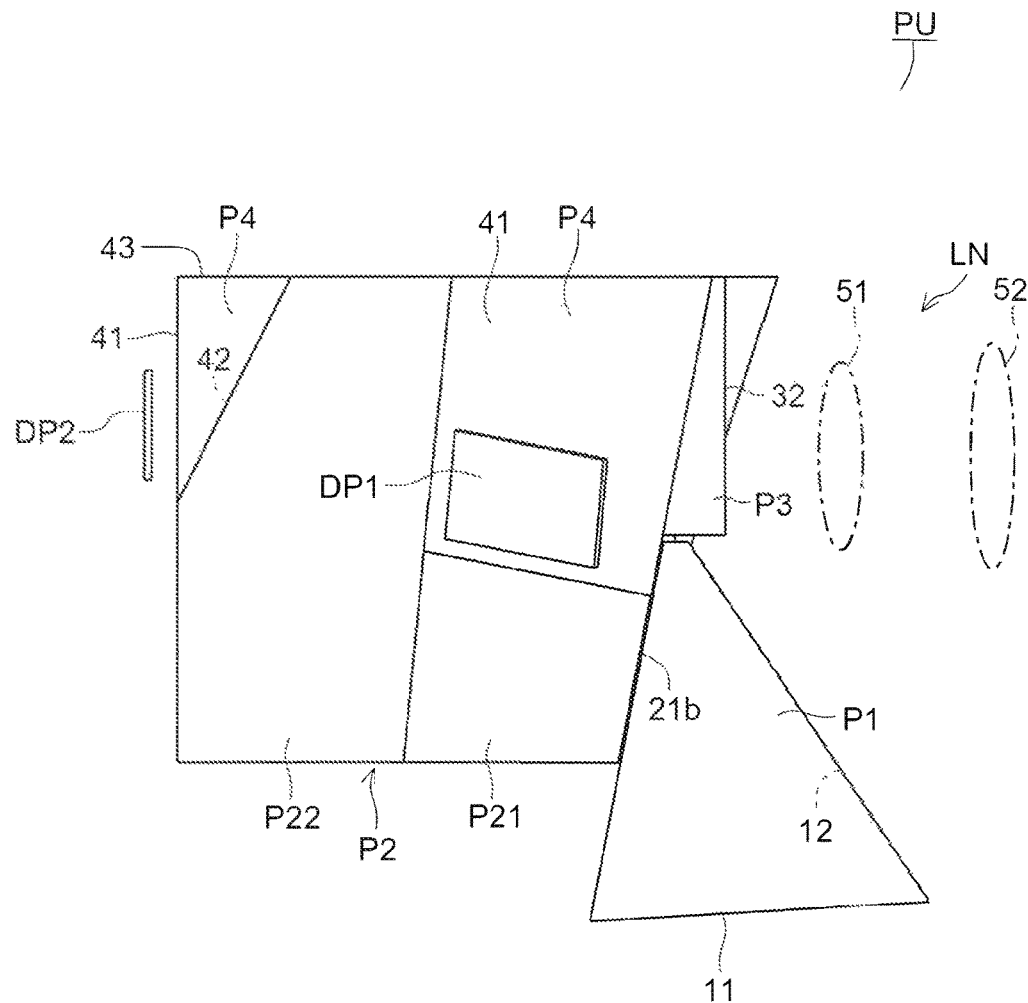
FIG. 5 is a side view of the optical unit according to one or more embodiments of the present invention.

The projection optical system LN includes lenses 51 and 52 (see FIG. 5) and the like, and projects the image displayed on the digital micromirror devices DP onto a screen SC on an enlarged scale. The actuator 4 moves the lenses 51 and 52 along the optical axis AX to achieve, for example, zooming and focusing. The actuator 4 also moves the lenses 51 and 52 in the up-down direction as seen in FIGS. 1 and 5 to permit the position (projection position) of the projected image to be changed in the up-down direction. That is, the actuator 4 and the projection optical system LN shift the projected image up and down. The controller 3 includes a CPU, and controls the entire projector PJ.

Figure 6:
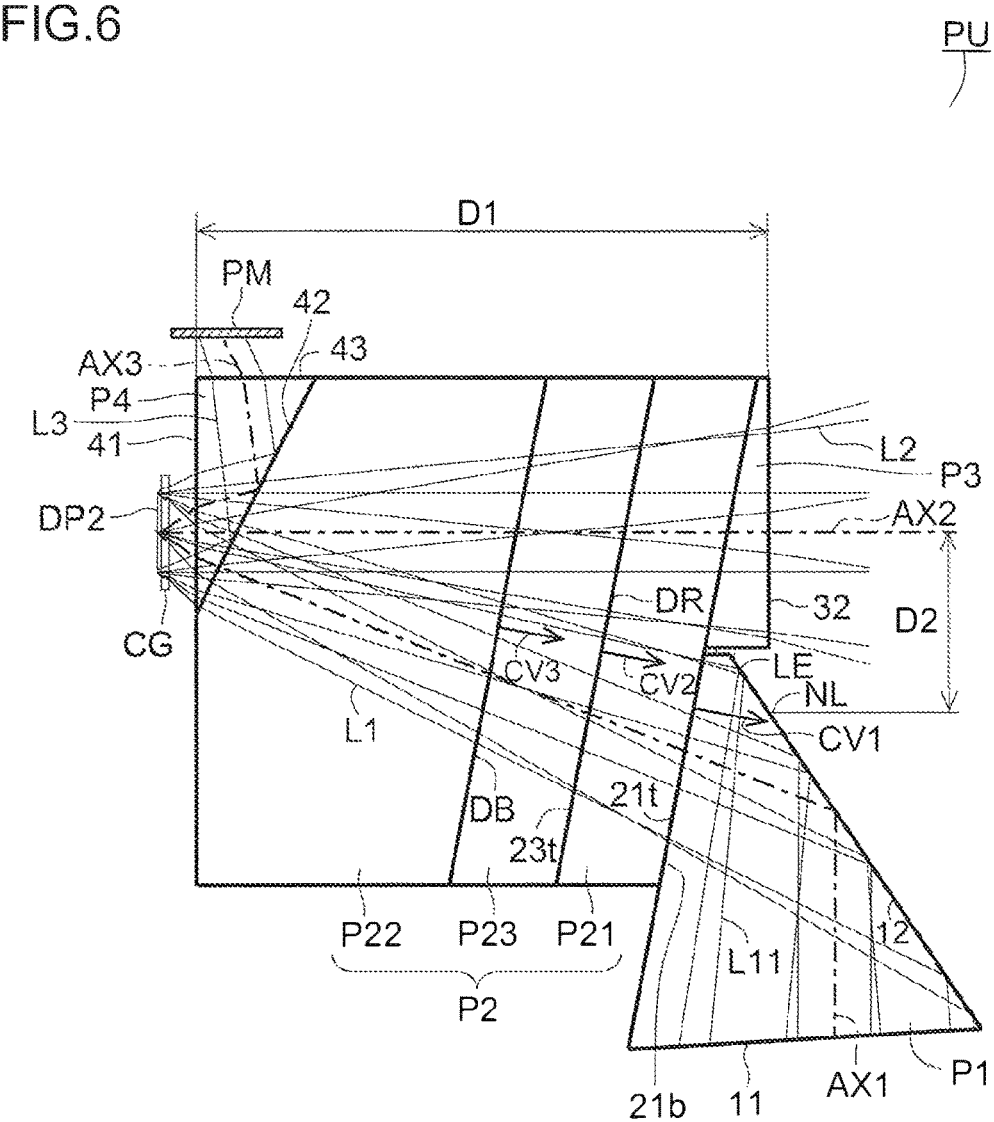
FIG. 6 is a side sectional view of the optical unit according to one or more embodiments of the present invention.

FIGS. 3 to 6 are an exploded perspective view, a top view, a side view, and a side sectional view, respectively, of the optical unit PU. FIG. 6 is a view along a sectional plane that passes through the digital micromirror device DP2 and that includes the optical axis AX2 of the ON-light L2 (projection light) reflected from the digital micromirror device DP2. The optical axis AX2 of the ON-light L2 reflected from the digital micromirror device DP2 coincides with the line normal to, and passing through the center of, the digital micromirror device DP2. The optical axis A1 of the illumination light L1 coincides with the optical path of the ray of the illumination light L1 that strikes the center of the digital micromirror devices DP.

The color-separating/integrating prism unit P2 is disposed between the digital micromirror device DP2 and the internal total reflection prism P1. On the projection side (emergence side) of the color-separating/integrating prism unit P2, the projection-side prism P3, which is wedge-shaped, is disposed.

Between the digital micromirror device DP1 and the color-separating/integrating prism unit P2, between the digital micromirror device DP2 and the color-separating/integrating prism unit P2, and between the digital micromirror device DP3 and the color-separating/integrating prism unit P2, the OFF-light separating prisms P4 are disposed respectively. That is, the OFF-light separating prisms P4 are provided to correspond to the digital micromirror devices DP respectively.

Between the digital micromirror devices DP and the OFF-light separating prisms P4, cover glasses CG (see FIG. 6) are provided respectively. In FIGS. 2 to 5, the cover glasses CG are omitted from illustration.

Figure 7:
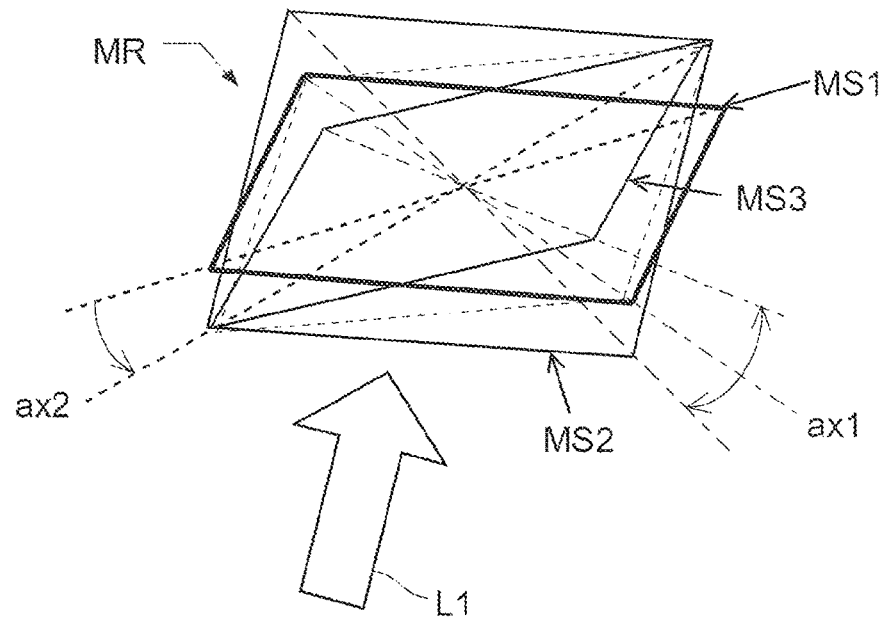
FIG. 7 is a perspective view showing a reference state, an ON state, and an OFF state of a micromirror in a digital micromirror device in the optical unit according to one or more embodiments of the present invention.
Figure 8:
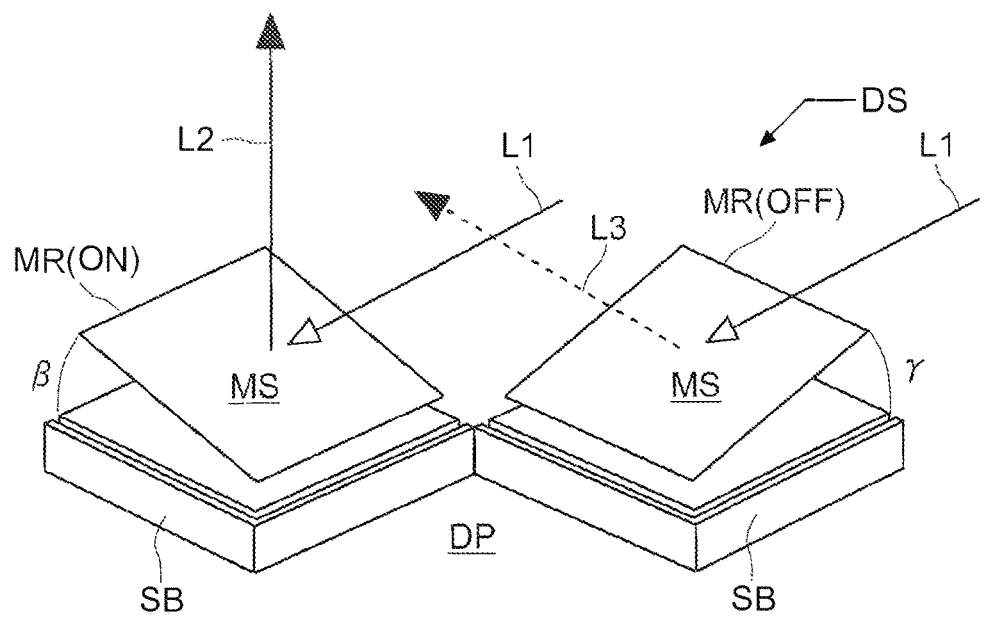
FIG. 8 is a perspective view illustrating the operation of a digital micromirror device in the optical unit according to one or more embodiments of the present invention.

FIG. 7 is a perspective view showing a reference state, an ON state, and an OFF state of a micromirror MR in a digital micromirror device DP. FIG. 8 is a perspective view illustrating the operation of a digital micromirror device DP. A digital micromirror device DP has a plurality of minute micromirrors MR, each substantially square in shape as seen in a plan view, that are disposed in a matrix. The micromirrors MR are mounted on a substrate SB, and the substrate SB is housed in a housing (unillustrated) substantially rectangular in shape.

The reference state of the micromirror MR is indicated by a reference plane MS1, the ON state of the micromirror MR is indicated by a reflective surface MS2, and the OFF state of the micromirror MR is indicated by a reflective surface MS3. The micromirror MR can, from the reference state, incline with respect to a first axis ax1 and then pivot with respect to a second axis ax2 perpendicular to the first axis ax1. Thus, the digital micromirror device DP has an image display surface DS composed of a plurality of pixel reflection facets MS, and these pixel reflection facets MS are ON/OFF controlled such that the micromirrors MR each take one of two angle states, namely an image displaying state (ON state) and an image non-displaying state (OFF state). That is, the digital micromirror device DP drives the micromirrors MR with respect to two mutually perpendicular axes to allow each of them to take one of the reference state, the ON state, and the OFF state. Thus, the digital micromirror device DP constitutes a reflective image display device that produces a desired image through intensity modulation on the illumination light L1. That is, the digital micromirror device DP produces the projection light through intensity modulation on the illumination light L1.

Since each micromirror MR is driven with respect to two mutually perpendicular axes (first and second axes ax1 and ax2), the pixel reflection facet MS of the micromirror MR inclines within different planes. In the digital micromirror device DP2 in one or more the embodiments under discussion, a state inclined within the YZ plane is the ON state, and a state inclined in the XZ plane is the OFF state. In typical ON/OFF control, when a pixel reflection facet MS is in the ON state, the illumination light L1 striking the micromirror MR is reflected in the direction normal to the image display surface DS (that is, normal to the digital micromirror device DP) to become ON-light L2 (projection light). On the other hand, when a pixel reflection facet MS is in the OFF state, the illumination light L1 striking the micromirror MR is reflected at a large angle relative to the direction normal to the image display surface DS to become OFF-light L3 (unnecessary light).

Figure 9:
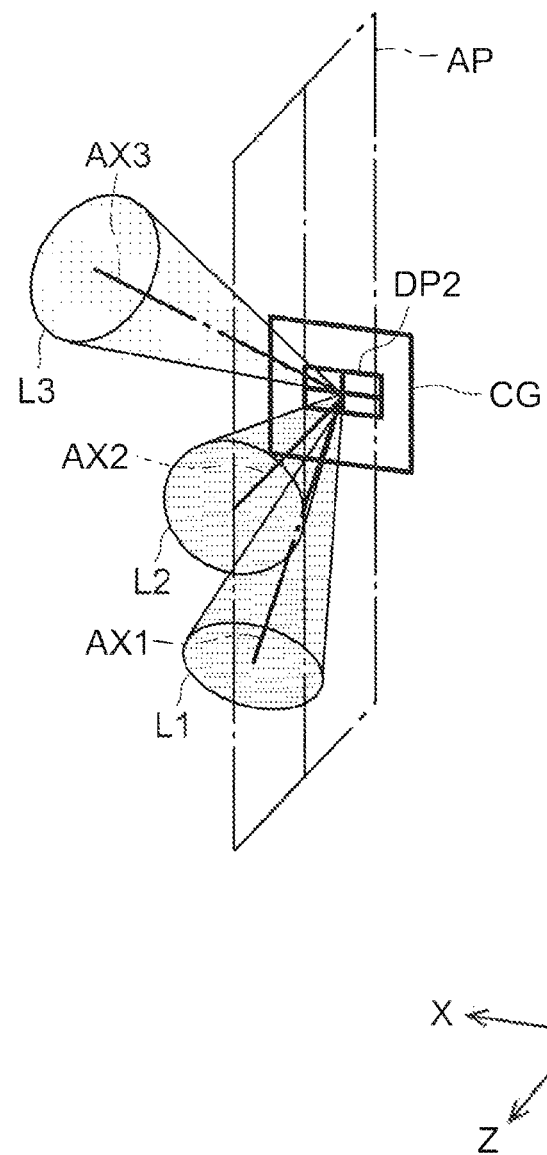
FIG. 9 is a diagram schematically showing illumination light striking micromirrors in a digital micromirror device, ON-light reflected from micromirrors in the ON state, and OFF-light reflected from micromirrors in the OFF state in the optical unit according to one or more embodiments of the present invention.

Thus, as shown in FIG. 9, near the digital micromirror device DP2, each micromirror MR reflects the OFF-light L3 in such a direction that the optical axis AX3 of the OFF-light L3 is increasingly far away from an optical axis plane AP that includes the optical axis AX2 of the ON-light L2 and the optical axis AX1 of the illumination light L1. The line normal to the image display surface DS (the line normal to the digital micromirror device DP) is parallel to the optical axis AX2 of the ON-light L2 (projection light) near the digital micromirror device DP2. Also near the digital micromirror devices DP1 and DP3, as with the digital micromirror device DP2, each micromirror MR reflects the OFF-light L3 in such a direction that it is increasingly far away from the plane (unillustrated) that includes the optical axes AX1 and AX2.

In one or more the embodiments under discussion, the angle β between the line normal to a micromirror MR in the ON state and the line normal to the digital micromirror device DP is 17°, and the angle γ between the normal to a micromirror MR in the OFF state and the normal to the digital micromirror device DP is 17°. Accordingly, the angle between the optical axis AX1 of the light (illumination light L1) striking the digital micromirror device DP and the line normal to the digital micromirror device DP is 34°.

As described above, on the image display surface DS of the digital micromirror device DP, a two-dimensional image is formed through intensity modulation on the illumination light L1. As mentioned above, the digital micromirror device DP expresses ON and OFF by driving the micromirrors MR with respect to two mutually perpendicular axes.

With reference back to FIGS. 2 to 6, the internal total reflection prism P1, the color-separating/integrating prism unit P2, the projection-side prism P3, and the OFF-light separating prisms P4 will be described. The internal total reflection prism P1 has an entrance face 11, an illumination light reflecting face 12, and an exit face 13 (see FIG. 3). The entrance face 11 is inclined in such a direction that, the closer to the screen SC, the closer to the projection optical system LN, and is where the illumination light L1 emitted from the illumination optical system 2 enters.

The illumination light reflecting face 12 is a total reflection plane formed on the internal total reflection prism P1, and is inclined in such a direction that, the farther away from the entrance face 11, the closer to the color-separating/integrating prism unit P2. The illumination light reflecting face 12 totally reflects the illumination light L1 entering via the entrance face 11 toward the color-separating/integrating prism unit P2.

The exit face 13 is disposed to face the color-separating/integrating prism unit P2, and is inclined in such a direction that, the closer to the entrance face 11, the farther away from the projection optical system LN. The exit face 13 is where the illumination light L1 totally reflected from the illumination light reflecting face 12 exits for the color-separating/integrating prism unit P2.

The color-separating/integrating prism unit P2, which includes the prisms P21, P22, and P23, is what is called a Philips-type dichroic prism unit, and has the prisms P21, P23, and P22 disposed in this order from the internal total reflection prism P1 toward the digital micromirror device DP2.

The prisms P21, P22, and P23 have entrance/exit faces 21a, 22a, and 23a respectively. The entrance/exit faces 21a, 22a, and 23a are located close to, so as to face, the OFF-light separating prisms P4 respectively. The entrance/exit faces 21a, 22a, and 23a are inclined in such directions that, the closer to an OFF-light exit face 43, which will be described later, the farther away from the digital micromirror devices DP1, DP2, and DP3, respectively.

An entrance/exit face 21b (first face) disposed on the exit side of the prism P21, which is located at the most exit-side (most projection optical system LN-side) position in the color-separating/integrating prism unit P2, is inclined in such a direction that, the closer to the entrance face 11 of the internal total-reflection prism P1, the farther away from the projection optical system LN. In one or more the embodiments under discussion, the entrance/exit face 21b is inclined at about 11° relative to the XY plane.

The optical axis AX1 of the illumination light L1 striking, as incident light L11, the illumination light reflecting face 12 and the optical axis AX2 of the ON-light L2 (projection light) on the entrance/exit face 21b are disposed on the same plane, which is an optical axis plane AP (see FIG. 9). The optical axis plane AP is the same plane as the plane of FIG. 6. A first component vector CV1 that is obtained, when a first, outward, normal vector VN1 (see FIG. 2) to the entrance/exit face 21b is projected onto the optical axis plane AP, by it being projected to be disposed on the same side as the optical axis AX1 of the incident light L11 with respect to the optical axis AX2 of the ON-light L2 points in a such direction that, the farther away from the entrance/exit face 21b, the farther away from the optical axis AX2 of the ON-light L2 leaving the entrance/exit face 21b.

The prisms P21 and P23 have, inside them, total reflection faces 21t and 23t respectively, and have, inside them, dichroic coat faces DR and DB respectively. The total reflection face 21t is the inner surface of the entrance/exit face 21b. The dichroic coat face DR is disposed to face the total reflection face 21t. The total reflection face 23t is disposed close to, so as to face, the dichroic coat face DR. The dichroic coat face DB is disposed close to, so as to face, the prism P22.

Figure 4:
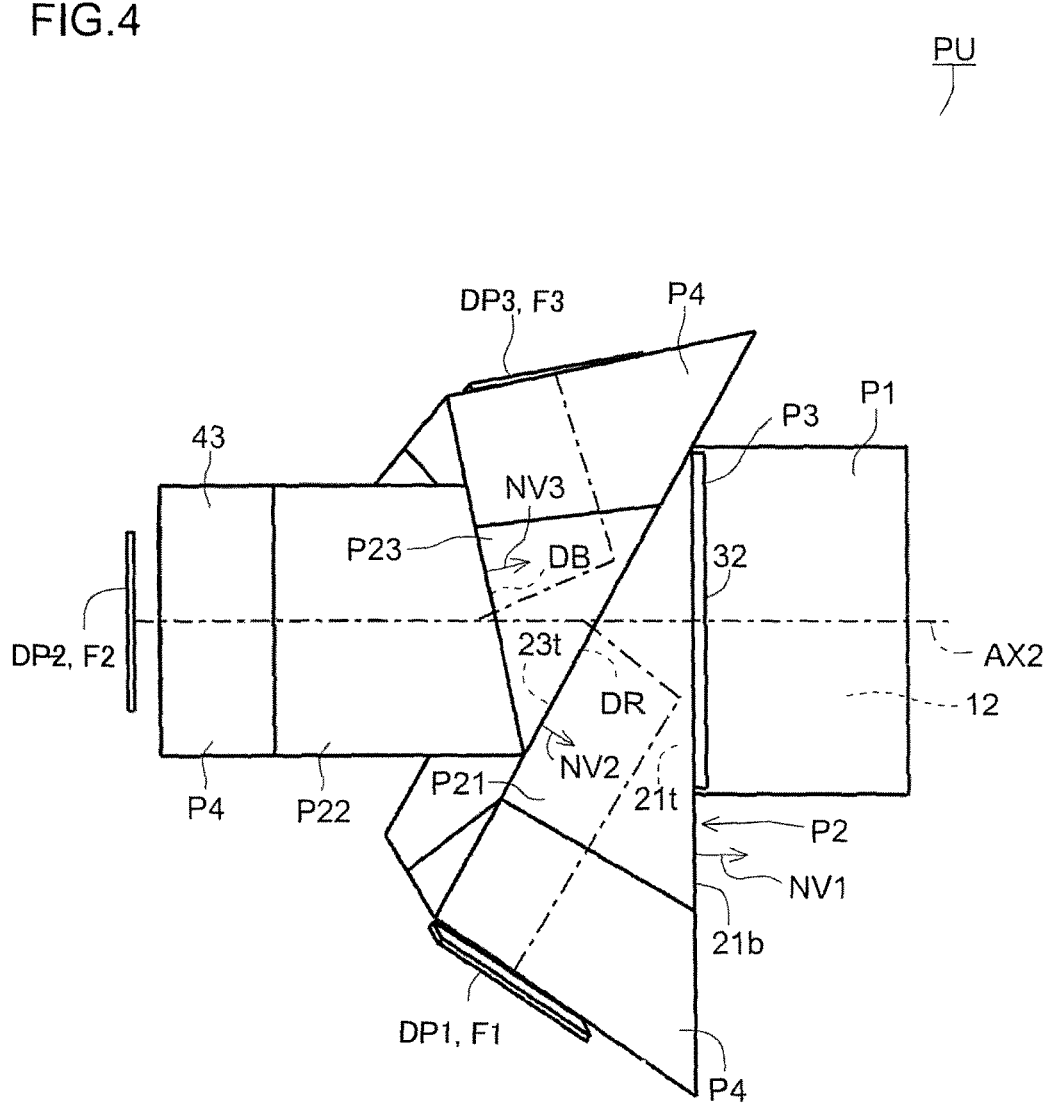
FIG. 4 is a top view of the optical unit according to one or more embodiments of the present invention.

As shown in FIG. 4, the dichroic coat face DR and the total reflection face 23t are, as seen from the Y direction, inclined in such a direction that, the farther away from the digital micromirror device DP1, the closer to the projection optical system LN. The dichroic coat face DB is, as seen from the Y direction, inclined in such a direction that, the farther away from the digital micromirror device DP3, the closer to the projection optical system LN. The entrance/exit face 21b and the total reflection face 21t are, as seen from the Y direction, perpendicular to the line normal to the digital micromirror device DP2. That is, the entrance/exit face 21b and the total reflection face 21t are, as seen from the Y direction, perpendicular to the optical axis AX2 of the ON-light L2 reflected from the digital micromirror device DP2.

A second component vector CV2 (see FIG. 6) that is obtained, when a second, inward, normal vector NV2 (see FIG. 4) to the dichroic coat face (opposite face) DR facing the entrance/exit face 21b is projected onto the optical axis plane AP, by it being projected to be disposed on the same side as the optical axis AX1 of the incident light L11 with respect to the optical axis AX2 of the ON-light L2 points in such a direction that, the farther away from the dichroic coat surface DR, the farther away from the optical axis AX2 of the ON-light L2 leaving the entrance/exit face 21b.

A third component vector CV3 (see FIG. 6) that is obtained, when a third, inward, normal vector NV3 (see FIG. 4) to the dichroic coat face DB is projected onto the optical axis plane AP, by it being projected to be disposed on the same side as the optical axis AX1 of the incident light L11 with respect to the optical axis AX2 of the ON-light L2 points in such a direction that, the farther away from the dichroic coat surface DB, the farther away from the optical axis AX2 of the ON-light L2 leaving the entrance/exit face 21*b*.

The dichroic coat face DR reflects the red component of the illumination light L1, and transmits the green and blue components of the illumination light L1. The dichroic coat face DB reflects the blue component of the illumination light L1, and transmits the green component of the illumination light L1. That is, the dichroic coat faces DR and DB reflect components of the illumination light L1 with predetermined wavelengths and transmit components of the illumination light L1 with other than predetermined wavelengths. Thus, the color-separating/integrating prism unit P2 performs color separation on the illumination light L1 exiting from the internal total reflection prism P1, and then directs the resulting light toward the digital micromirror devices DP respectively.

The dichroic coat face DR reflects red ON-light L2, and transmits green and blue ON-light L2. The dichroic coat face DB reflects blue ON-light L2, and transmits green ON-light L2. That is, the dichroic coat faces DR and DB reflect ON-light L2 with predetermined wavelengths, and transmit ON-light L2 with other than predetermined wavelengths. Thus, the color-separating/integrating prism unit P2 performs color integration on the red, green, and blue ON-light L2 leaving the digital micromirror devices DP1, DP2, and DP3 respectively, and then directs the resulting light via the entrance/exit face 21*b* toward the emergence side.

The prisms P21 and P23 may be disposed the other way around. That is, the prism P23 may be disposed on the emergence side of the prism P21. The color-separating/integrating prism unit P2 may be formed using, instead of what is called a Philips-type dichroic prism unit, a cross dichroic prism unit.

The projection-side prism P3 (emergence-side optical member or optic) is disposed on the exit side (emergence side) of the prism P21 in the color-separating/integrating prism unit P2, and on the side opposite from (in FIG. 2, over) the entrance face 11 of the internal total reflection prism P1, and has an entrance face 31 and an exit face 32 (second face, emergence face). "Emergence face" refers to the face via which ON-light L2 is shone out of the optical unit PU toward the projection optical system LN. The entrance face 31 is, as seen from the X direction, inclined in such a direction that, the farther away from the internal total-reflection prism P1, the closer to the projection optical system LN. The entrance face 31 is where the ON-light L2 (projection light after color integration) leaving the entrance/exit face 21*b* enters.

The exit face 32 is disposed to face the projection optical system LN, and is where the ON-light L2 exits such that the optical axis AX2 of the ON-light L2 coincides with the direction normal to the exit face 32. The projection-side prism P3 serves to reduce distortion in the image projected on the screen SC. A projection optical system LN-side end part of the internal total reflection prism P1 protrudes from the exit face 32 of the projection-side prism P3 in the emergence direction (Z direction).

The OFF-light separating prisms P4 are disposed close to, so as to face, the entrance/exit faces 21*a*, 22*a*, and 23*a* respectively. The OFF-light separating prisms P4 each have an entrance/exit face 41, an OFF-light reflecting face 42, and an OFF-light exit face 43. The entrance/exit faces 41 are disposed close to, so as to face, the digital micromirror devices DP1, DP2, and DP3 respectively, and, near the digital micromirror devices DP1, DP2, and DP3, the optical axis AX2 of the ON-light L2 coincides with the direction normal to the entrance/exit faces 41 respectively.

The OFF-light exit faces 43 are end faces (Y-direction end faces; in FIG. 2, upper faces) opposite from the entrance face 11 of the internal total reflection prism P1 with respect to the optical axis AX2 of the ON-light L2. The OFF-light reflecting faces 42, which are disposed near the digital micromirror devices DP1, DP2, and DP3 respectively, are inclined in such a way that, the closer to the OFF-light exit face 43, the farther away from the digital micromirror devices DP1, DP2, and DP3 respectively. The OFF-light reflecting faces 42 totally reflect the OFF-light L3 reflected from micromirrors MR in the OFF state, and transmit the ON-light L2 reflected from micromirrors MR in the ON state. The OFF-light exit faces 43 are where the OFF-light L3 totally reflected from the OFF-light reflecting faces 42 exits from the optical unit PU.

Light absorbing members PM are provided at a distance from, so as to face, the OFF-light exit faces 43 respectively. The light absorbing members PM are formed as, for example, metal plates treated by blackening, and absorb the OFF-light L3 leaving the OFF-light exit faces 43. This helps prevent thermal deformation of, for example, other members inside the projector PJ due to the OFF-light L3 exiting from the optical unit PU.

Between the internal total reflection prism P1 and the color-separating/integrating prism unit P2, between the color-separating/integrating prism unit P2 and the projection-side prism P3, and between the color-separating/integrating prism unit P2 and the OFF-light separating prisms P4 respectively, layers of air (air gaps, unillustrated) are provided. In the color-separating/integrating prism unit P2, also between the prisms P21 and P23 and between the prisms P23 and P22 respectively, layers of air are provided.

In the projector PJ configured as described above, white light emitted from the light source 1 (see FIG. 1) is converged by the illumination optical system 2 (see FIG. 1) so that white illumination light L1 is emitted toward the optical unit PU.

The white illumination light L1 enters the internal total-reflection prism P1 via the entrance face 11, and is then totally reflected on the illumination light reflecting face 12. The white illumination light L1 totally reflected from the illumination light reflecting face 12 exits via the exit face 13, and then enters the prism P21 in the color-separating/integrating prism unit P2 via the entrance/exit face 21*b*.

The white illumination light L1 having entered the prism P21 in the color-separating/integrating prism unit P2 then strikes the dichroic coat face DR, where the red component of the illumination light L1 is reflected, and the green and blue components are transmitted. The green and blue components of the illumination light L1 transmitted through the dichroic coat face DR enters the prism P23, where the blue component is reflected on the dichroic coat face DB while the green component is transmitted through the dichroic coat face DB to enter the prism P22.

The red component of the illumination light L1 reflected from the dichroic coat face DR, the blue component of the illumination light L1 reflected from the dichroic coat face DB, and the green component of the illumination light L1 transmitted through the dichroic coat faces DR and DB exits via the entrance/exit faces 21*a*, 23*a*, and 22*a* respectively, and then enter the OFF-light separating prisms P4 respectively. The red, green, and blue components of the illumination light L1 transmitted through the OFF-light separating prisms P4 respectively exit via the entrance/exit faces 41, then passes through the cover glasses CG to strike the digital micromirror devices DP1, DP3, and DP2 respectively. Thus, the color-separating/integrating prism unit P2 performs color separation on the illumination light L1 totally reflected from the illumination light reflecting face 12, and directs the resulting light toward the digital micromirror devices DP1, DP2, and DP3 respectively.

The red, green, and blue ON-light L2 reflected from micromirrors MR in the ON state in the digital micromirror devices DP1 to and DP3 enters the OFF-light separating prisms P4 via the entrance/exit faces 41 respectively, and then passes through the OFF-light reflecting faces 42 to enter, through the entrance/exit faces 21a, 22a, and 23a respectively, the prisms P21, P22, and P23 in the color-separating/integrating prism unit P2.

Red ON-light L2, having been totally reflected on the total reflection face 21t of the prism P21, is then reflected on the dichroic coat face DR to be directed to the entrance/exit face 21b. Green ON-light L2, having been transmitted through the prism P22, then passes through the dichroic coat faces DB and DR in this order to be directed to the entrance/exit face 21b. Blue ON-light L2, having been totally reflected on the total reflection face 23t of the prism P23, is reflected on the dichroic coat face DB, and is then transmitted through the dichroic coat face DR to be directed to the entrance/exit face 21b. Meanwhile, red, green, and blue ON-light L2, as it passes through the color-separating/integrating prism unit P2, undergoes color integration, and the color-integrated ON-light L2 exits via the entrance/exit face 21b toward the emergence side.

The ON-light L2 (projection light after color integration) having exited via the entrance/exit face 21b enters the projection-side prism P3 via the entrance face 31. The ON-light L2 having entered the projection-side prism P3 is transmitted through it to exit via the exit face 32 toward the projection optical system LN.

Here, as shown in FIG. 6, the illumination light reflecting face 12 is disposed outside the beam of the ON-light L2. That is, the ON-light L2 does not strike the illumination light reflecting face 12. Thus, the beam of the illumination light L1 and the beam of the ON-light L2 can be separated from each other within the Z-direction distance D1 (in one or more the embodiments under discussion, about 85 mm) between the entrance/exit face 41 of the OFF-light separating prism P4 corresponding to the digital micromirror device DP2 and the exit face 32.

A color-separating/integrating prism unit P2-side end part of the beam of the illumination light L1 on the illumination light reflecting face 12 is disposed on the same side as the color-separating/integrating prism unit P2 with respect to the exit face 32. That is, a color-separating/integrating prism unit P2-side end part LE (see FIG. 6) of the region resulting from the beam of the illumination light L1 on the illumination light reflecting face 12 being projected onto the optical axis plane AP is disposed on the same side as the color-separating/integrating prism unit P2 with respect to the exit face 32. Moreover, the intersection line NL between the illumination light reflecting face 12 and the exit face 32 is disposed outside the beam of the ON-light L2 on the exit face 32. Thus, the beam of the ON-light L2 on the exit face 32 does not overlap with the beam of the illumination light L1 on the illumination light reflecting face 12. Here, the "intersection line NL between the illumination light reflecting face 12 and the exit face 32" refers to the intersection line of the plane including and parallel to the exit face 32 with the illumination light reflecting face 12.

The plane (in one or more the embodiments under discussion, the same plane as the optical axis plane AP) that includes the optical axis AX2 of the ON-light L2 leaving the entrance/exit face 21b and that passes through the center of the digital micromirror device DP2 in its longer-side direction and runs parallel to its shorter-side direction is perpendicular to the illumination light reflecting face 12.

The ON-light L2 that has entered the projection optical system LN is projected onto the screen SC (see FIG. 1). Thus, the color image displayed on the digital micromirror devices DP is projected onto the screen SC. Meanwhile, the actuator 4 performs zooming and focusing. The projection-side prism P3 shines out the ON-light L2 via the exit face 32 such that the optical axis AX2 coincides with the direction normal to the exit face 32. In this way, it is possible to reduce distortion in the image projected on the screen SC on an enlarged scale.

The actuator 4 permits the projection lenses 51 and 52 in the projection optical system LN to be moved in the Y direction, and thereby permits the projection position of the projected image to be changed in the Y direction. For example, in a case where the projector PJ is installed on a ceiling surface in a room (unillustrated), the projection lenses 51 and 52 are moved toward the internal total reflection prism P1 (in FIG. 5, downward). The projector PJ can then project an image on the screen SC at a position away from the ceiling.

Here, the first component vector CV1 points in such a direction that, the farther away from the entrance/exit face 21b, the farther away from the optical axis AX2 of the ON-light L2 leaving the entrance/exit face 21b. Thus, even when the distance D2 between the optical axis AX2 of the ON-light L2 on the exit face 32 and the intersection line NL is increased, of all the rays of the illumination light L1 directed to the internal total reflection prism P1, even the color-separating/integrating prism unit P2-side rays of the illumination light L1 enter via the entrance face 11 so as to be totally reflected on the illumination light reflecting face 12.

On the other hand, the OFF-light L3 reflected from micromirrors MR in the OFF state in the digital micromirror devices DP1, DP2, and DP3 enters the OFF-light separating prisms P4 via the entrance/exit faces 41, is then totally reflected on the OFF-light reflecting faces 42, and is then discharged out of the optical unit PU via the OFF-light exit faces 43. The OFF-light L3 discharged out of the optical unit PU is absorbed by the light absorbing members PM. This helps prevent the OFF-light L3 from entering the projection optical system LN. It is thus possible to prevent a drop in the contrast of the projected image.

Here, the light absorbing members PM are provided away from the OFF-light exit faces 43. This helps reduce the heat that conducts from the light absorbing members PM having absorbed the OFF-light L3 to the optical unit PU. It is thus possible to suppress a rise in the temperature of the optical unit PU, and to prevent, for example, thermal deformation of the optical unit PU. This helps prolong the lifetime of the optical unit PU and the projector PJ.

The illumination light L1 (flat light) reflected on micromirrors MR in the middle of shifting from one to the other of the ON and OFF states is reflected in the direction opposite, with respect to the direction normal to the micromirrors MR, to the illumination light L1 as the incident light. The flat light and the illumination light L1 reflected from the cover glasses CG enter the OFF-light separating prisms P4 and then exit via the OFF-light exit faces 43. It is thus possible to prevent the flat light or the illumination light L1 reflected from the cover glasses CG from entering the projection optical system LN. This helps further prevent a drop in the contrast of the projected image.

Here, in each of the OFF-light separating prisms P4, the angle $\theta_{ON}$ of incidence of the ray of ON-light L2 with the largest angle of incidence with respect to the OFF-light reflecting face 42 and the angle $\theta_{OFF}$ of incidence of the ray of OFF-light L3 with the smallest angle of incidence with respect to the OFF-light reflecting face 42 fulfill conditional formula (1) below, because then the OFF-light reflecting face 42 transmits the ON-light L2 and almost totally reflects the OFF-light L3.

$$\theta_{OFF} > \sin^{-1}(1/n) > \theta_{ON} \qquad (1)$$

where $\theta_{ON}$ represents the angle of incidence of the ray of ON-light L2 with the largest angle of incidence with respect to the OFF-light reflecting face 42;

$\theta_{OFF}$ represents the angle of incidence of the ray of OFF-light L3 with the smallest angle of incidence with respect to the OFF-light reflecting face 42; and n represents the index of refraction of the OFF-light separating prisms P4.

For example, in a case where the index of refraction of the OFF-light separating prisms P4 is 1.5168, setting the angle of incidence $\theta_{ON}$ at 36.5° and setting the angle of incidence $\theta_{OFF}$ at 43.7° allows conditional formula (1) to be fulfilled, and thus permits the OFF-light reflecting face 42 to transmit the ON-light L2 while almost totally reflecting the OFF-light L3.

Between the projector PJ employing the optical unit PU according to one or more the embodiments under discussion and a projector employing an optical unit according to a comparative example, the up-down shift amount (Y-direction shift amount) of the projection optical system LN was compared.

Figure 10:
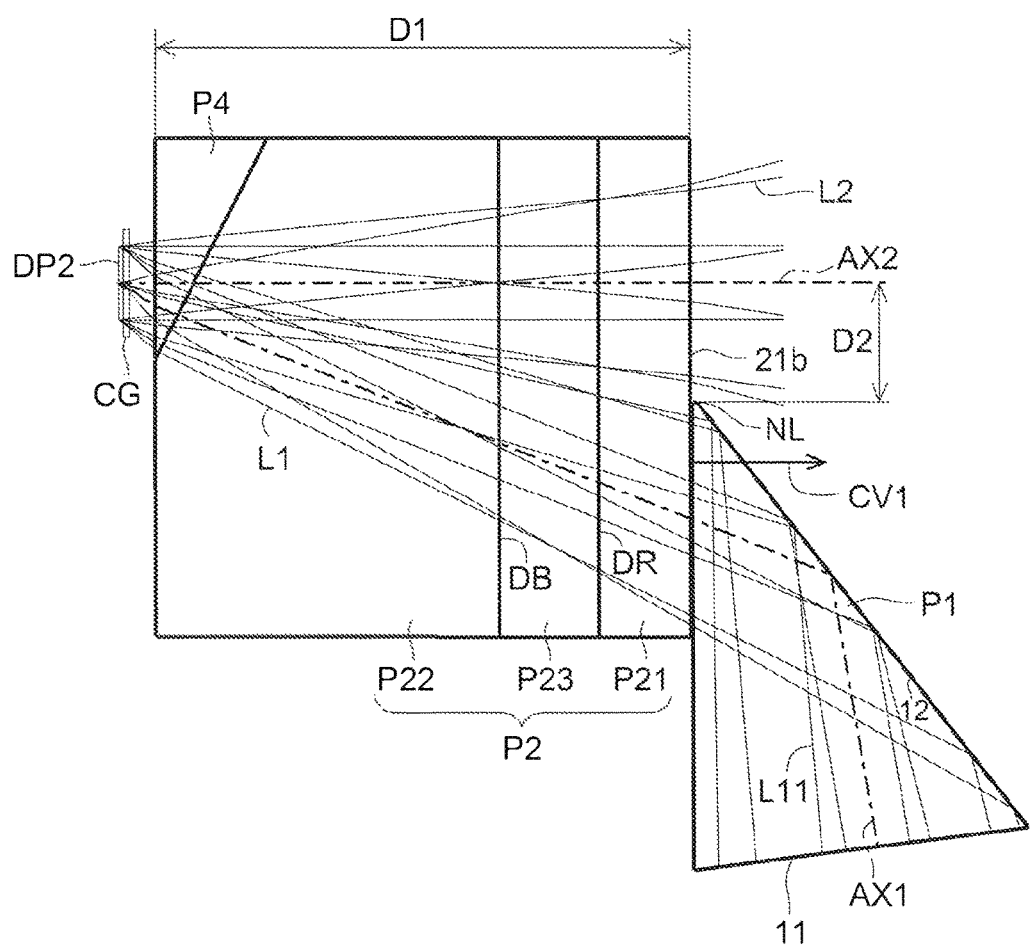
FIG. 10 is a side sectional view of an optical unit of a comparative example.
Figure 11:
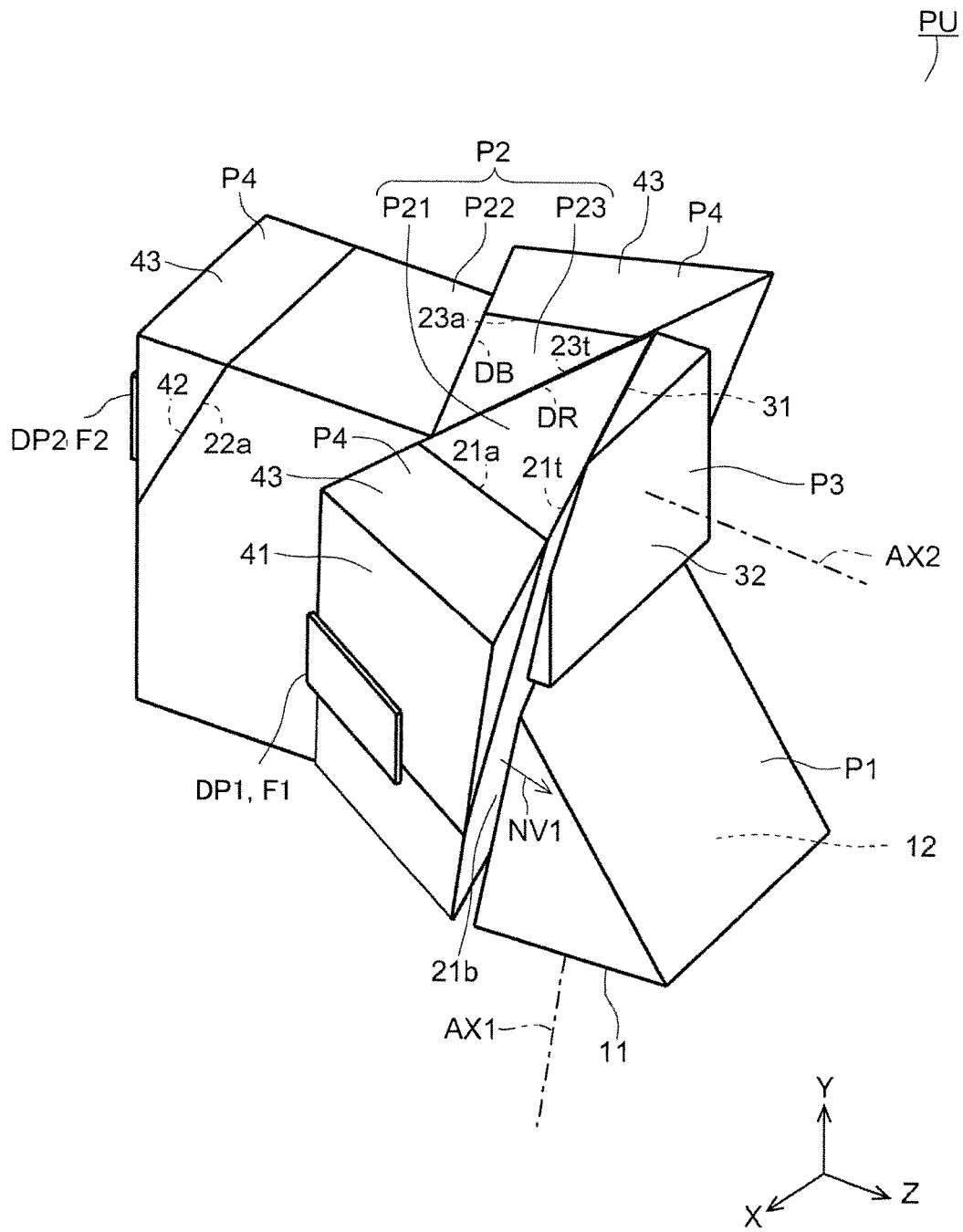
FIG. 11 is a perspective view of an optical unit according to one or more embodiments of the present invention.
Figure 12:
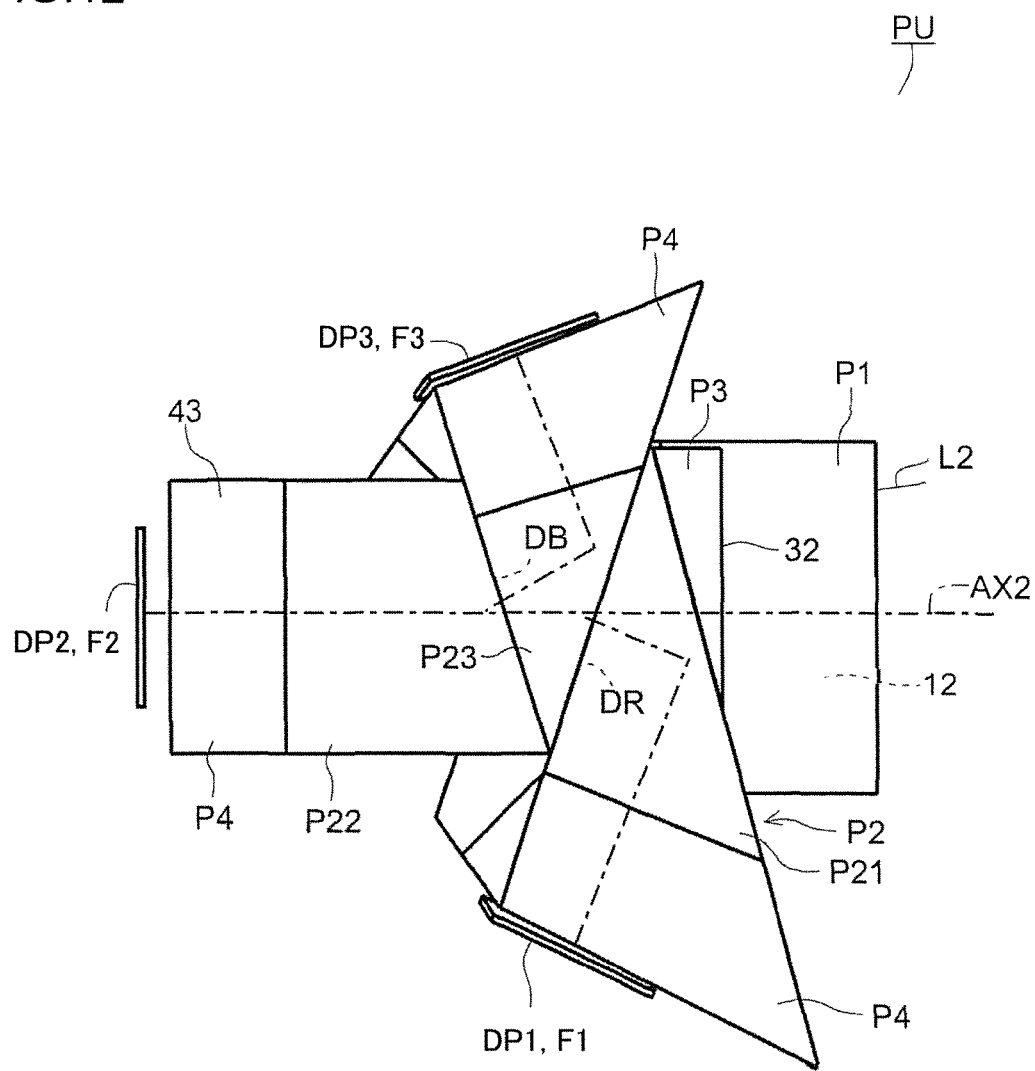
FIG. 12 is a top view of the optical unit according to one or more embodiments of the present invention.
Figure 13:
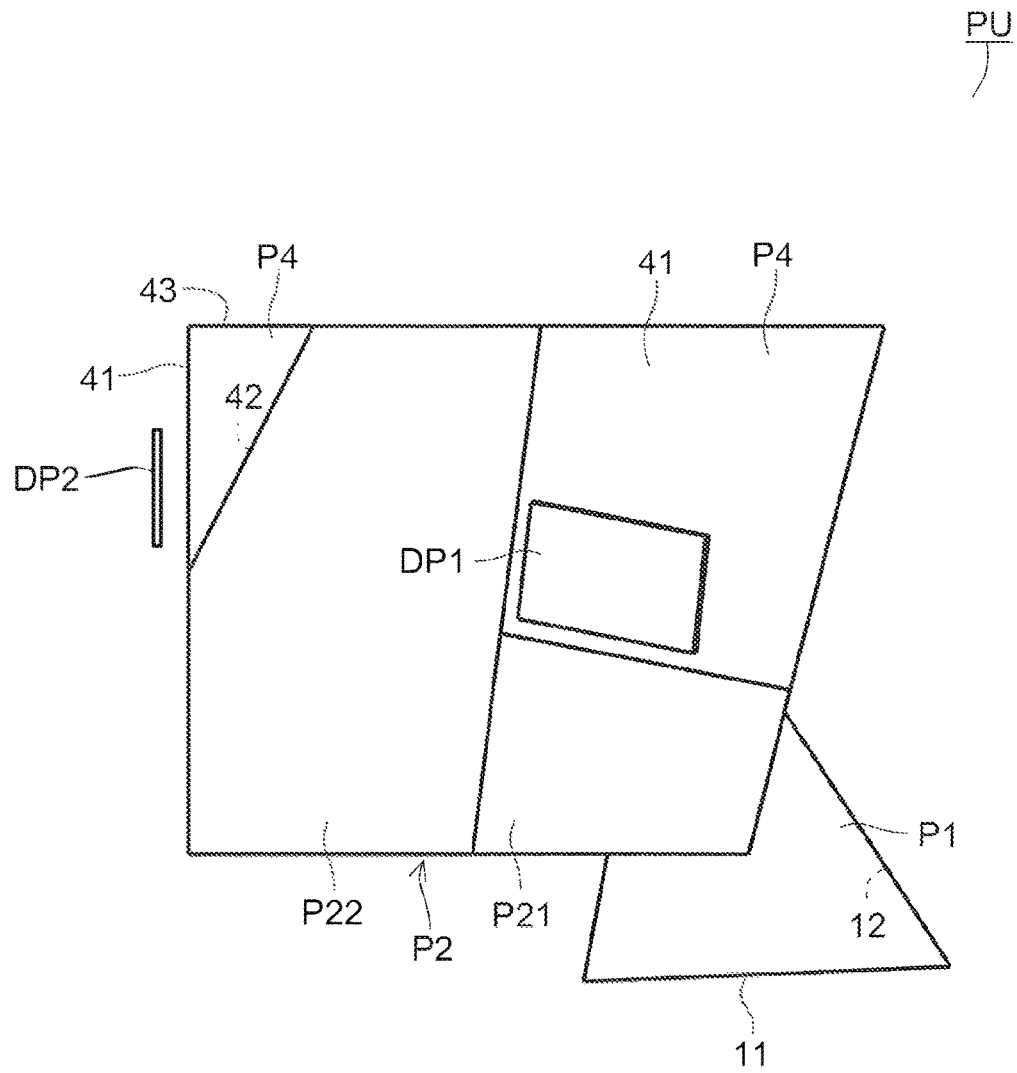
FIG. 13 is a side view of the optical unit according to one or more embodiments of the present invention.
Figure 14:
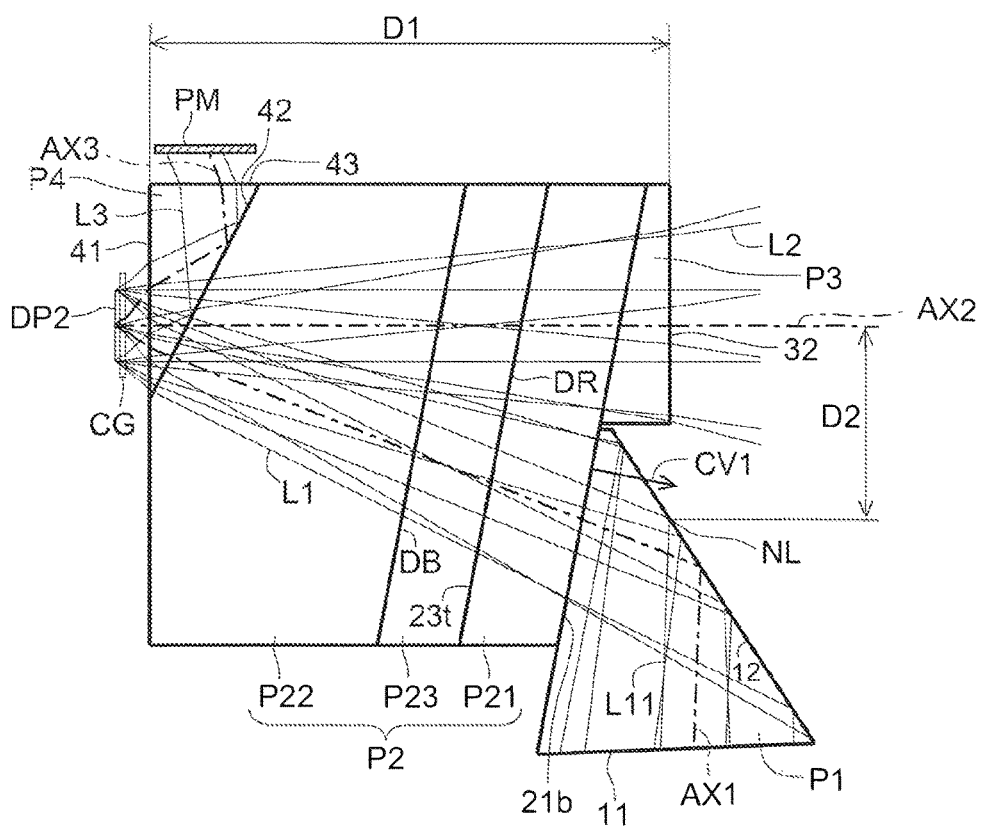
FIG. 14 is a side sectional view of the optical unit according to one or more embodiments of the present invention.
Figure 14:
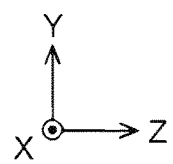
Figure 15:
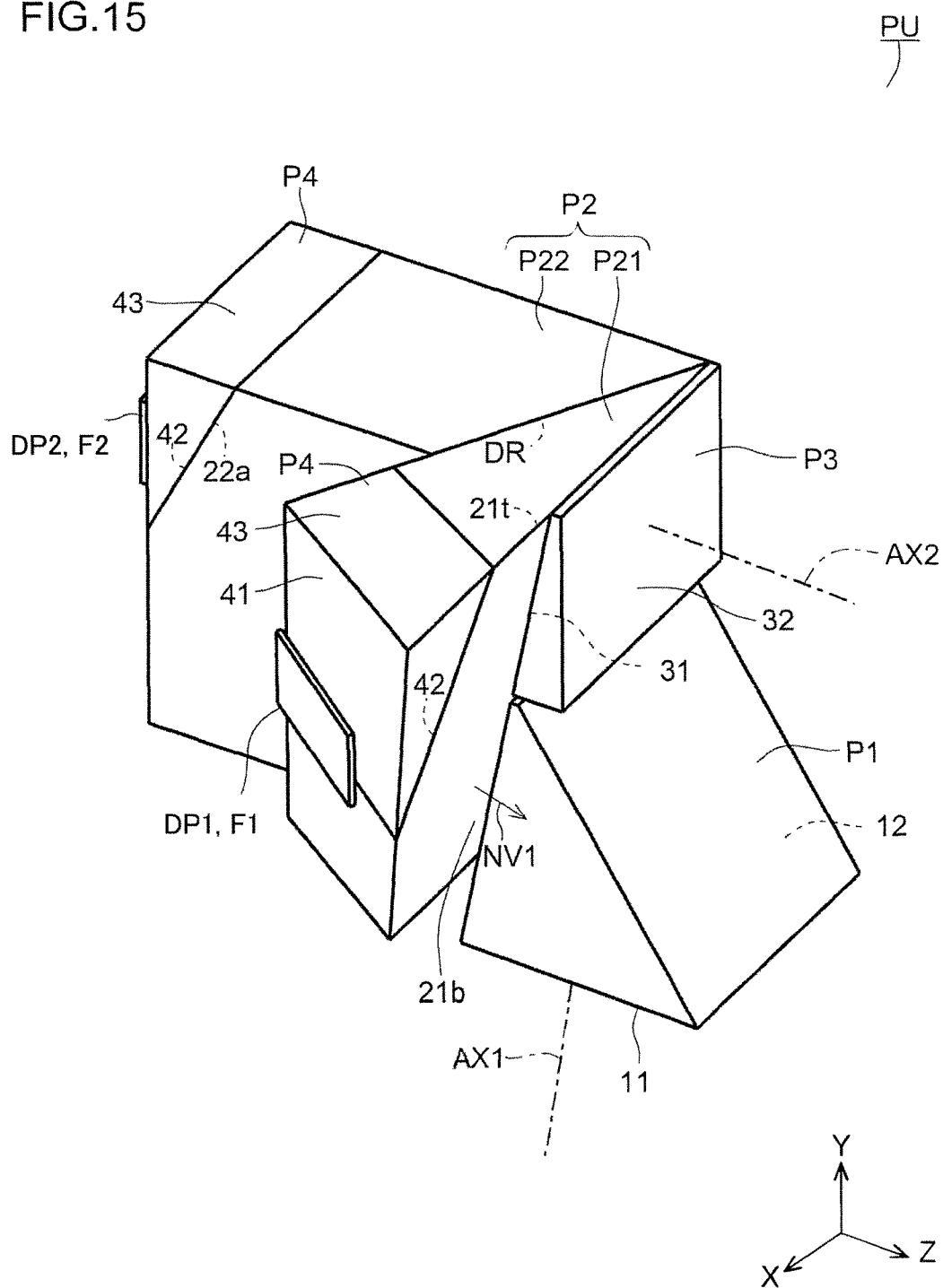
FIG. 15 is a perspective view of an optical unit according to one or more embodiments of the present invention.
Figure 16:
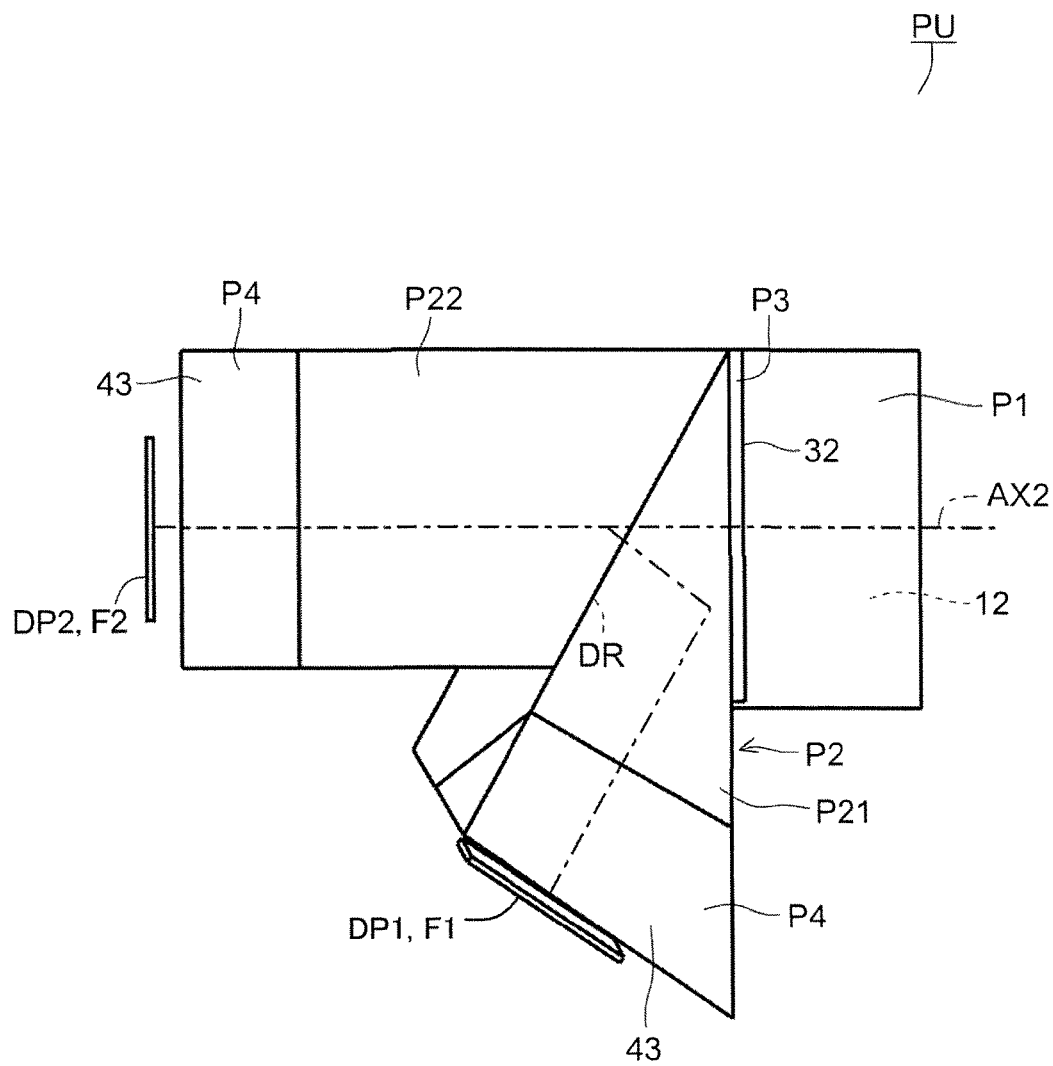
FIG. 16 is a top view of the optical unit according to one or more embodiments of the present invention.
Figure 17:
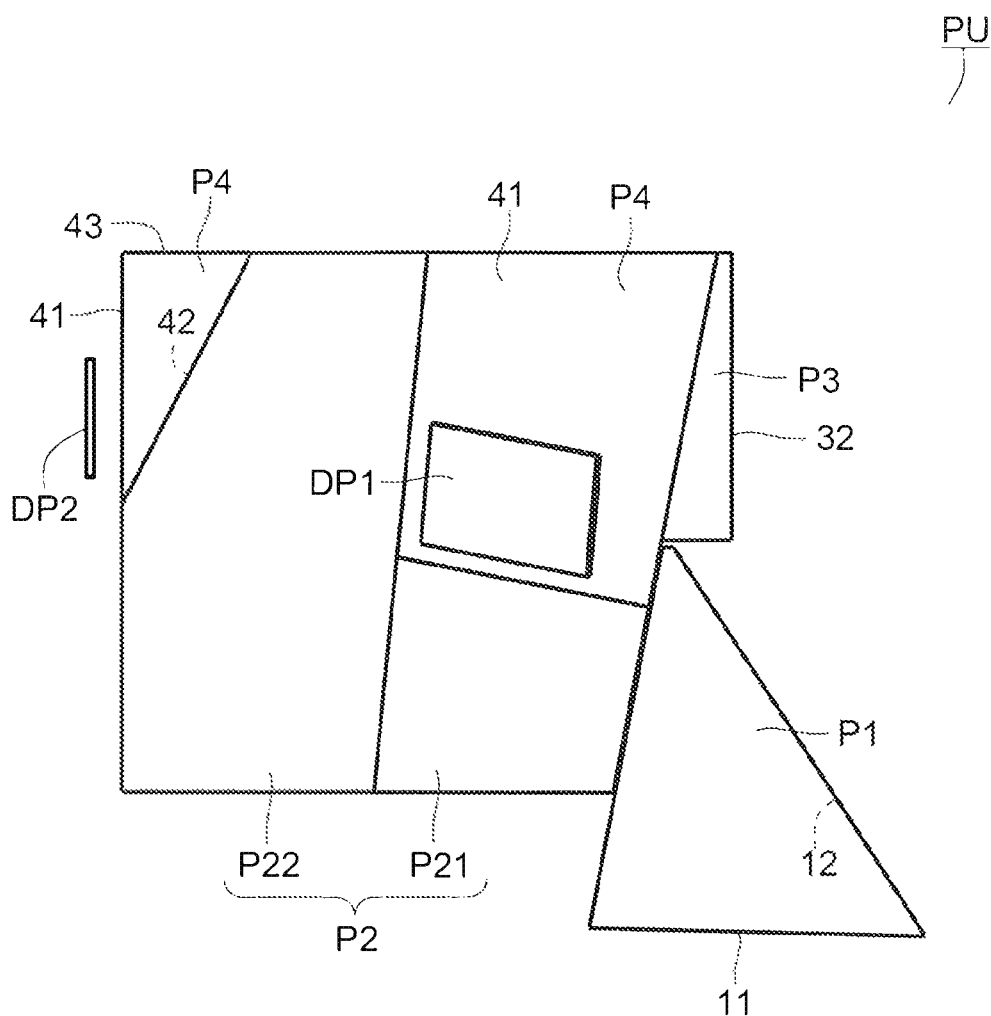
FIG. 17 is a side view of the optical unit according to one or more embodiments of the present invention.
Figure 18:
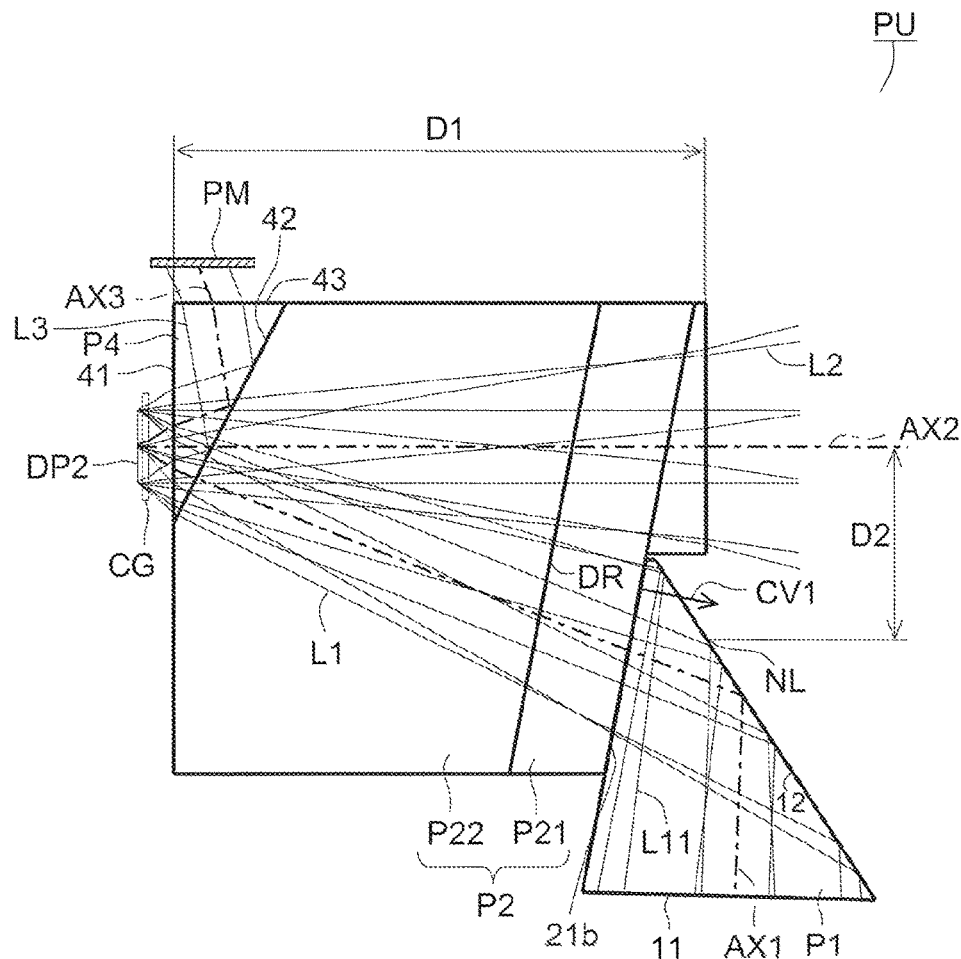
FIG. 18 is a side sectional view of the optical unit according to one or more embodiments of the present invention.
Figure 18:
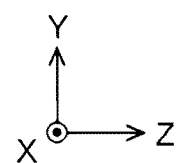

FIG. 10 is a side sectional view of the optical unit of the comparative example. For convenience' sake, such parts as find their counterparts in the optical unit PU of one or more the embodiments under discussion are identified by common reference signs. In the comparative example, the entrance/exit face 21b of the prism P21 in the color-separating/integrating prism unit P2 is perpendicular to the optical axis AX2 of the color-integrated ON-light L2. In the comparative example, the projection-side prism P3 is omitted. Accordingly, while the emergence face in one or more the embodiments under discussion coincides with the exit face 32 of the projection-side prism P3, the emergence face in the comparative example coincides with the entrance/exit face 21b of the prism P21. Otherwise, the comparative example is structured similarly to the optical unit PU of one or more the embodiments under discussion. The up-down shift amount is the distance D2 (see FIGS. 6 and 10) between the optical axis AX2 of the ON-light L2 on the emergence face and the intersection line NL. The Z-direction distance D1 between the entrance/exit face 41 facing the digital micromirror device DP2 and the exit face 32 is 85 mm in both one or more the embodiments under discussion and the comparative example. The angle of inclination of the illumination light reflecting face 12 relative to the XZ plane is the same in one or more the embodiments under discussion and the comparative example.

While the up-down shift amount of the projection optical system LN in the projector PJ according to one or more the embodiments under discussion was 26.6 mm, the up-down shift amount of the projection optical system in the projector of the comparative example was 19.0 mm That is, the up-down shift amount when the optical unit PU according to one or more the embodiments under discussion is used is 7.6 mm longer than that in the comparative example. Thus, the up-down shift amount of the projection optical system LN in the projector PJ provided with the optical unit PU according to one or more the embodiments under discussion can be made longer than that in the comparative example. In one or more the embodiments under discussion and the comparative example, the f-number of the illumination light L1 was approximately the same, and the luminance of the projected image was approximately the same.

According to one or more the embodiments under discussion, a first component vector CV1 that is obtained, when a first, outward, normal vector NV1 to the entrance/exit face 21b is projected onto the optical axis plane AP, by it being projected to be disposed on the same side as the optical axis AX1 of the incident light L11 with respect to the optical axis AX2 of the ON-light L2 points in such a direction that, the farther away from the entrance/exit face 21b, the farther away from the optical axis AX2 of the ON-light L2 leaving the entrance/exit face 21b. Thus, even when the distance D2 between the optical axis AX2 of the ON-light L2 on the exit face 32 (emergence face) and the intersection line NL is increased, of all the rays of the illumination light L1 directed to the internal total reflection prism P1, even the color-separating/integrating prism unit P2-side rays of the illumination light L1 enter via the entrance face 11 so as to be totally reflected on the illumination light reflecting face 12. Thus, when the projection optical system LN is arranged, it is possible, while preventing a drop in the amount of light in the emergent ON-light L2 (projection light), to increase the Y-direction shift amount of the projection optical system LN, and thereby to enhance the usability of the optical unit PU.

The prisms P21 (first prism) and P23 (first prism) have dichroic coat faces DR and DB respectively, and the color-separating/integrating prism unit P2 (prism unit) performs color separation on the illumination light L1 and color integration on the ON-light L2 (projection light). It is thus possible to separate white illumination light into colors easily and to integrate projection light of different colors easily.

A second component vector CV2 that is obtained, when a second, inward, normal vector NV2 to the dichroic coat face (opposite face) DR facing the entrance/exit face 21b of the prism P21 (first prism) having the entrance/exit face 21b is projected onto the optical axis plane AP, by it being projected to be disposed on the same side as the optical axis AX1 of the incident light L11 with respect to the optical axis AX2 points in such a direction that, the farther away from the dichroic coat surface DR, the farther away from the optical axis AX2 of the ON-light L2 leaving the entrance/exit face 21b. It is thus possible, while inclining the entrance/exit face 21b, to give the prism P21 a sufficient Z-direction length, and thus to further prevent a drop in the amount of light in the illumination light L1 directed to the digital micromirror devices DP.

The illumination light reflecting face 12 is disposed outside the beam of the ON-light L2. Thus, the beam of the illumination light L1 and the beam of the ON-light L2 can be separated from each other with the Z-direction distance D1 between the entrance/exit face 41 facing the digital micromirror device DP2 and the exit face 32. Accordingly, the ON-light L2 does not passes through the illumination light reflecting face 12, and thus, compared with a structure where the projection-side prism P3 is disposed close to, so as to face, the illumination light reflecting face 12, there are less layers of air (air gaps) through which the ON-light L2 passes. It is thus possible to enhance the transmittance for the ON-light L2 through the optical unit PU, and thereby to enhance the quality of the projected image.

The illumination light reflecting face 12 is constituted by the total reflection face in the internal total reflection prism P1 (reflecting member). Thus, the cross section of the beam of the illumination light L1 on the illumination light reflecting face 12 is smaller than the cross section of the beam of the illumination light L1 before striking the entrance face 11. It is thus possible, while suppressing an increase in the size of the illumination light reflecting face 12, to further prevent a drop in the amount of light in the ON-light L2. It is also possible to enhance the efficiency of reflection on the illumination light L1 reflecting face 12, and to still further prevent a drop in the amount of light in the ON-light L2.

The projection-side prism P3 (emergence-side optical member) is provided which has an exit face 32 (second face) in the direction of the normal to which the optical axis AX2 of the ON-light L2 (projection light) is disposed and via which the ON-light L2 exits, and the projection-side prism P3 is disposed on the ON-light L2's exits direction side of the entrance/exit face 21b. It is thus possible to reduce distortion in the projected image. A color-separating/integrating prism unit P2 (prism unit)-side end part of the beam of the illumination light L1 on the illumination light reflecting face 12 is disposed on the same side of the color-separating/integrating prism unit P2 with respect to the exit face 32, and the intersection line NL between the illumination light reflecting face 12 and the exit face 32 is disposed outside the beam of the ON-light L2 on the exit face 32. It is thus possible to more reliably obtain a satisfactory Y-direction shift amount of the projection optical system LN.

A plurality of fitting portions F1, F2, F3 for the fitting of the digital micromirror devices DP are provided, and these fitting portions F1, F2, F3 are disposed to correspond to the prisms P21 to P23 respectively. The digital micromirror device DP forms an image through intensity modulation on the illumination light L1 resulting from ON/OFF control of the inclination of each of a plurality of micromirrors MR that pivot about a pivot axis. Thus, it is possible to easily fit the digital micromirror devices DP to the optical unit PU, and thereby to easily obtain an optical unit PU that can emit projection light generated by the digital micromirror devices DP.

Each micromirror MR has two mutually perpendicular pivot axes, and the driving of each micromirror MR is performed about the two pivot axes. This helps enhance the luminance of the projected image. The plane that includes the optical axis AX2 of the ON-light L2 leaving the entrance/exit face 21b and that passes through the center of the digital micromirror device DP2 (one of the digital micromirror devices DP) in its longer-side direction and runs parallel to its shorter-side direction is perpendicular to the illumination light reflecting face 12. This helps make the cross section of the beam of the illumination light L1 smaller, and it is thus possible to more reliably direct the beam of the illumination light L1 to the illumination light reflecting face 12.

Between the digital micromirror devices DP1, DP2, and DP3 and the prisms P21, P22, and P23 respectively, the OFF-light separating prisms P4 (third prisms) are disposed. The OFF-light separating prisms P4 have OFF-light reflecting faces 42 that transmit the ON-light L2 (projection light) reflected from micromirrors MR in the ON state in the digital micromirror devices DP and that reflect the OFF-light L3 (unnecessary light) reflected from micromirrors MR in the OFF state in the digital micromirror devices DP. Thus, the OFF-light L3 can be discharged out of the optical unit PU without being directed to the color-separating/integrating prism unit P2. Thus, it is possible to prevent the OFF-light L3 from entering the projection lenses 51 and 52 in the projection optical system LN. It is thus possible to prevent generation of stray light, and to enhance the contrast of the projected image.

Fulfilling conditional formula (1) permits the OFF-light reflecting faces 42 to transmit the ON-light L2 and almost totally reflect the OFF-light L3.

The projector PJ includes the optical unit PU, the light source 1, the illumination optical system 2 which emits illumination light L1 toward the internal total reflection prism P1 (reflecting member), and the projection optical system LN which projects the image displayed on the digital micromirror devices DP fitted to the fitting portions F1, F2, F3 onto the screen SC on an enlarged scale. It is thus possible to easily build a projector PJ provided with the optical unit PU.

The projection optical system LN is disposed to face the entrance/exit face 21b of the optical unit PU, and the internal total reflection prism P1 is disposed below the optical axis AX2 of the ON-light L2 leaving the entrance/exit face 21b. The projection optical system LN can move up and down. It is thus possible to easily build a projector PJ that allows up and downward shifting.

Next, one or more embodiments of the present invention will be described. FIGS. 11 to 14 are a perspective view, a top view, a side view, and a side sectional view, respectively, of an optical unit PU according to one or more embodiments. For convenience's sake, such parts as find their counterparts in one or more embodiments shown in FIGS. 1 to 9 are identified by common reference numerals. In one or more embodiments, the entrance/exit face 21b (first face) of the color-separating/integrating prism unit P2 is structured differently than in one or more embodiments described above; otherwise, the structure here is similar to that in one or more embodiments described above.

The entrance/exit face 21b of the prism P21 in the color-separating/integrating prism unit P2 according to one or more embodiments is, as seen from the Y direction, inclined in such a direction that, the farther away from the digital micromirror device DP1, the farther away from the projection optical system LN. The projection-side prism P3 is, as seen from the Y direction, in a triangular shape.

The operation of the projector PJ provided with the optical unit PU structured as described is similar to that in one or more embodiments described above.

Between the projector PJ employing the optical unit PU according to one or more embodiments and a projector employing an optical unit according to a comparative example, the up-down shift amount (Y-direction shift amount) of the projection optical system LN was compared. In the comparative example, as in FIG. 10, the first component vector CV1 is parallel to the optical axis AX2 of the ON-light L2 leaving the entrance/exit face 21b. In both one or more embodiments and the comparative example, the emergence face coincides with the exit face 32 of the projection-side prism P3. Otherwise, the comparative example was structured similarly to the optical unit PU according to one or more embodiments. The up-down shift amount was measured in a similar manner as in one or more embodiments described above. The Z-direction distance D1 between the entrance/exit face 41 facing the digital micromirror device DP2 and the exit face 32 is 85 mm in both one or more embodiments and the comparative example. The angle of inclination of the illumination light reflecting face 12 relative to the XZ plane is the same in one or more embodiments and the comparative example.

While the up-down shift amount of the projection optical system LN in the projector PJ employing the optical unit PU according to one or more embodiments was 31.5 mm, the up-down shift amount of the projection optical system in the projector employing the optical unit of the comparative example was 27.6 mm That is, the up-down shift amount when the optical unit PU according to one or more embodiments is used is 3.9 mm longer than that in the comparative example. Thus, the up-down shift amount of the projection optical system LN in the projector PJ provided with the optical unit PU according to one or more embodiments can be made longer than that in the comparative example. In one or more embodiments and the comparative example, the f-number of the illumination light L1 was approximately the same, and the luminance of the projected image was approximately the same.

Also with one or more embodiments, it is possible to obtain similar effects as with one or more embodiments described above.

Next, one or more embodiments of the present invention will be described. FIGS. 15 to 18 are a perspective view, a top view, a side view, and a side sectional view, respectively, of an optical unit PU according to one or more embodiments. For convenience's sake, such parts as find their counterparts in one or more embodiments shown in FIGS. 1 to 9 are identified by common reference numerals. In one or more embodiments, the color-separating/integrating prism unit P2 is structured differently than in one or more embodiment described above; otherwise, the structure here is similar to that in one or more embodiments described above.

In one or more embodiments, the color-separating/integrating prism unit P2 is composed of prisms P21 and P22, and thus compared with the color-separating/integrating prism unit P2 in one or more embodiments described above, the prism P23 is omitted. Also the digital micromirror device DP3 corresponding to the prism P23 is omitted. The light source 1 comprises a UHP lamp, and between the light source 1 and the illumination optical system 2, a color wheel (unillustrated) is disposed.

The operation of the projector PJ provided with the optical unit PU structured as described above is, after the illumination light L1 enters via the entrance face 11, similar to that in one or more embodiments described above. In one or more embodiments, the red component of the illumination light L1 strikes the digital micromirror device DP1, and the green and blue components of the illumination light L1 having passed through the color wheel alternately strike the digital micromirror device DP2.

Between the projector PJ employing the optical unit PU according to one or more embodiments and a projector employing an optical unit according to a comparative example, the up-down shift amount (Y-direction shift amount) of the projection optical system LN was compared. In the comparative example, as in the structure shown in FIG. 10, the entrance/exit face 21b of the prism P21 in the color-separating/integrating prism unit P2 is perpendicular to the optical axis AX2 of the color-integrated ON-light L2. In the comparative example, the projection-side prism P3 is omitted. Thus, the emergence face in one or more embodiments coincides with the exit face 32 of the projection-side prism P3, and the emergence face in the comparative example coincides with the entrance/exit face 21b of the prism P21. Otherwise, the comparative example was structured similarly to the optical unit PU according to one or more embodiments. The up-down shift amount was measured in a similar manner as in one or more embodiments described above. The Z-direction distance D1 between the entrance/exit face 41 facing the digital micromirror device DP2 and the exit face 32 is 85 mm in both one or more embodiments and the comparative example. The angle of inclination of the illumination light reflecting face 12 relative to the XZ plane is the same in one or more embodiments and the comparative example.

While the up-down shift amount of the projection optical system LN in the projector PJ employing the optical unit PU according to one or more embodiments was 30.5 mm, the up-down shift amount of the projection optical system in the projector employing the optical unit of the comparative example was 19.0 mm That is, the up-down shift amount when the optical unit PU according to one or more embodiments is used is 11.5 mm longer than that in the comparative example. Thus, the up-down shift amount of the projection optical system LN in the projector PJ provided with the optical unit PU according to one or more embodiments can be made longer than that in the comparative example. In one or more embodiments and the comparative example, the f-number of the illumination light L1 was approximately the same, and the luminance of the projected image was approximately the same.

Also with one or more embodiments, it is possible to obtain similar effects as with one or more embodiments described above. Moreover, it is possible to reduce, as compared with one or more embodiments described above, the number of digital micromirror devices DP, which are expensive.

Figure 19:
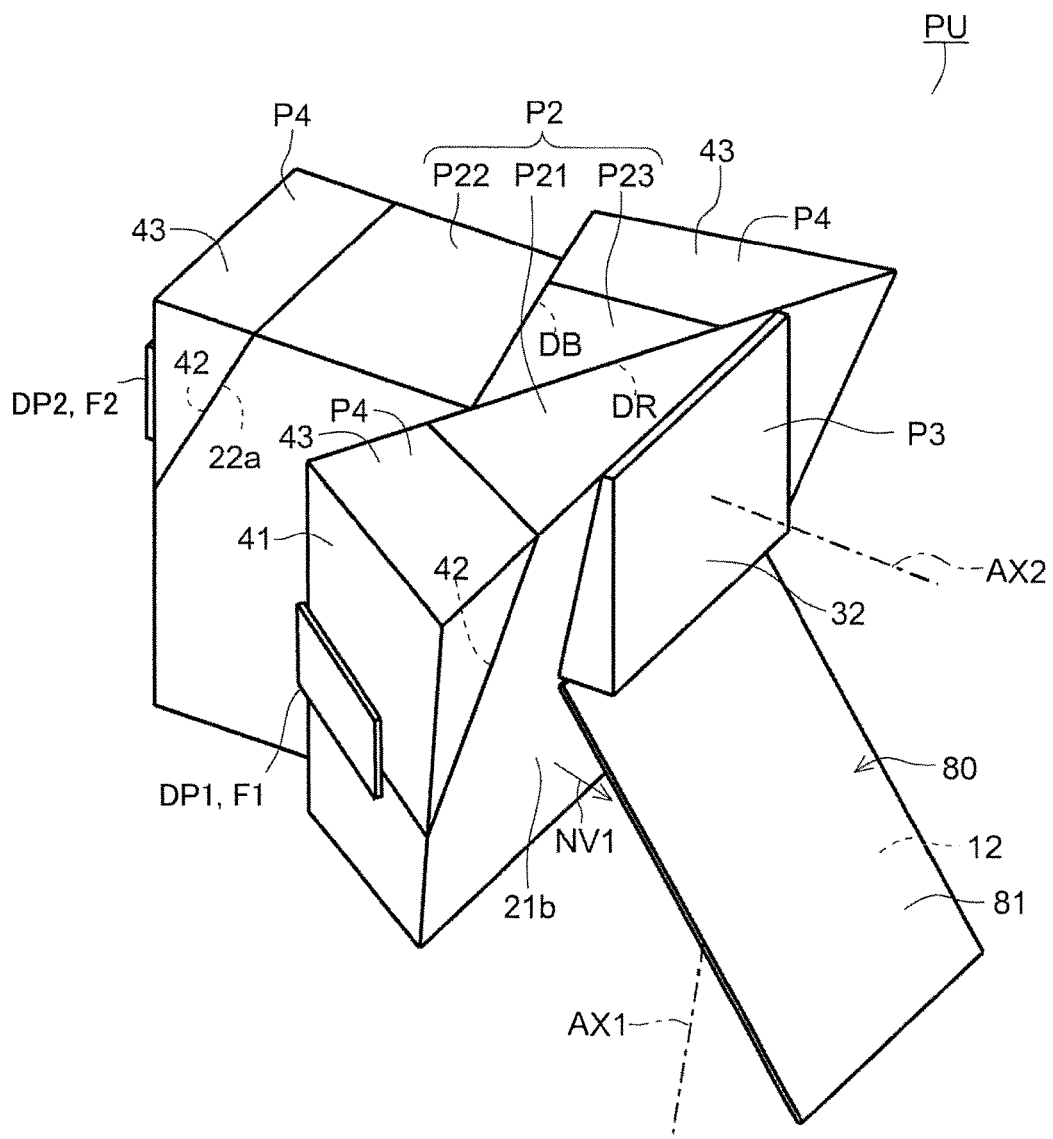
FIG. 19 is a perspective view of an optical unit according to one or more embodiments of the present invention.
Figure 20:
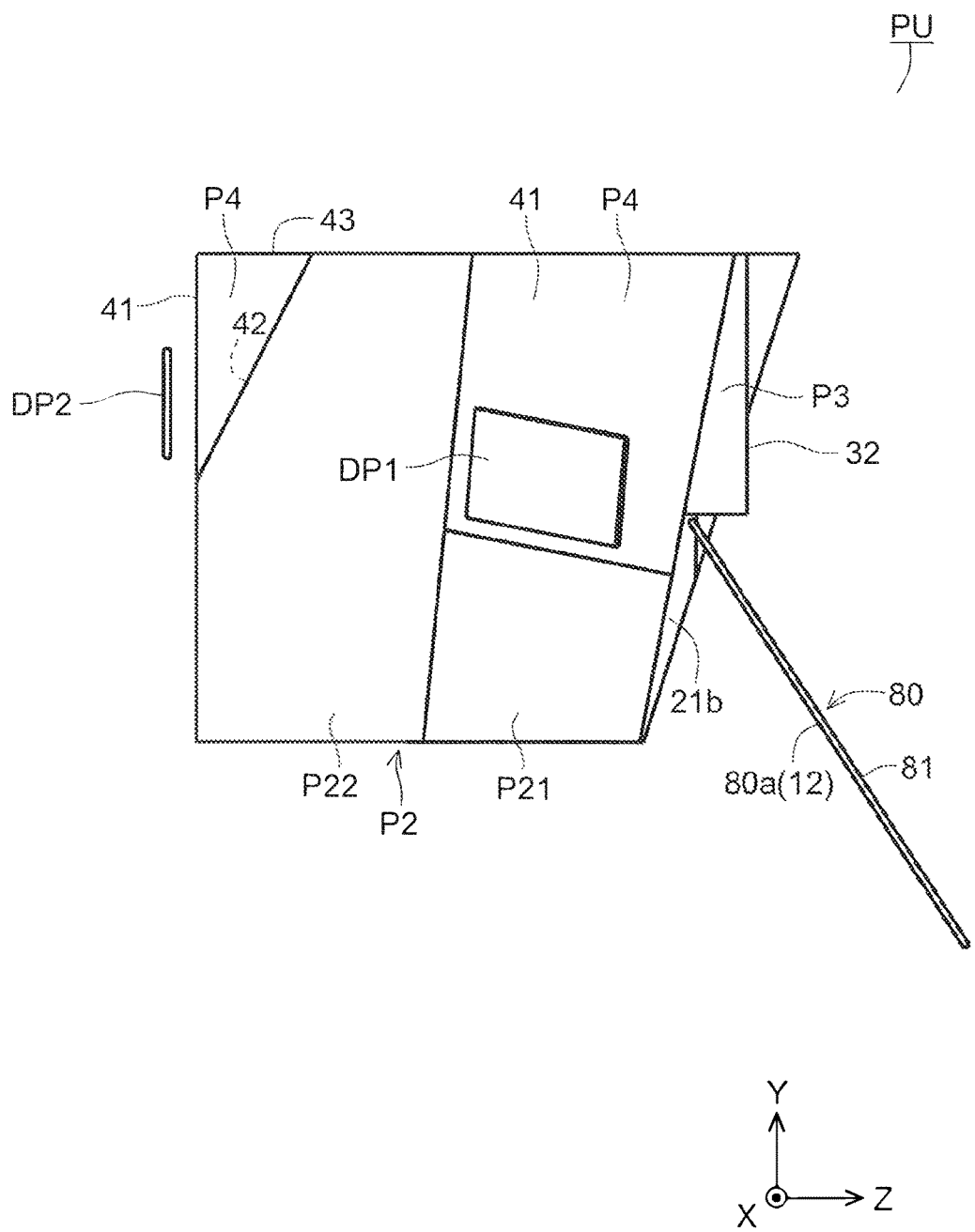
FIG. 20 is a side view of the optical unit according to one or more embodiments of the present invention.
Figure 21:
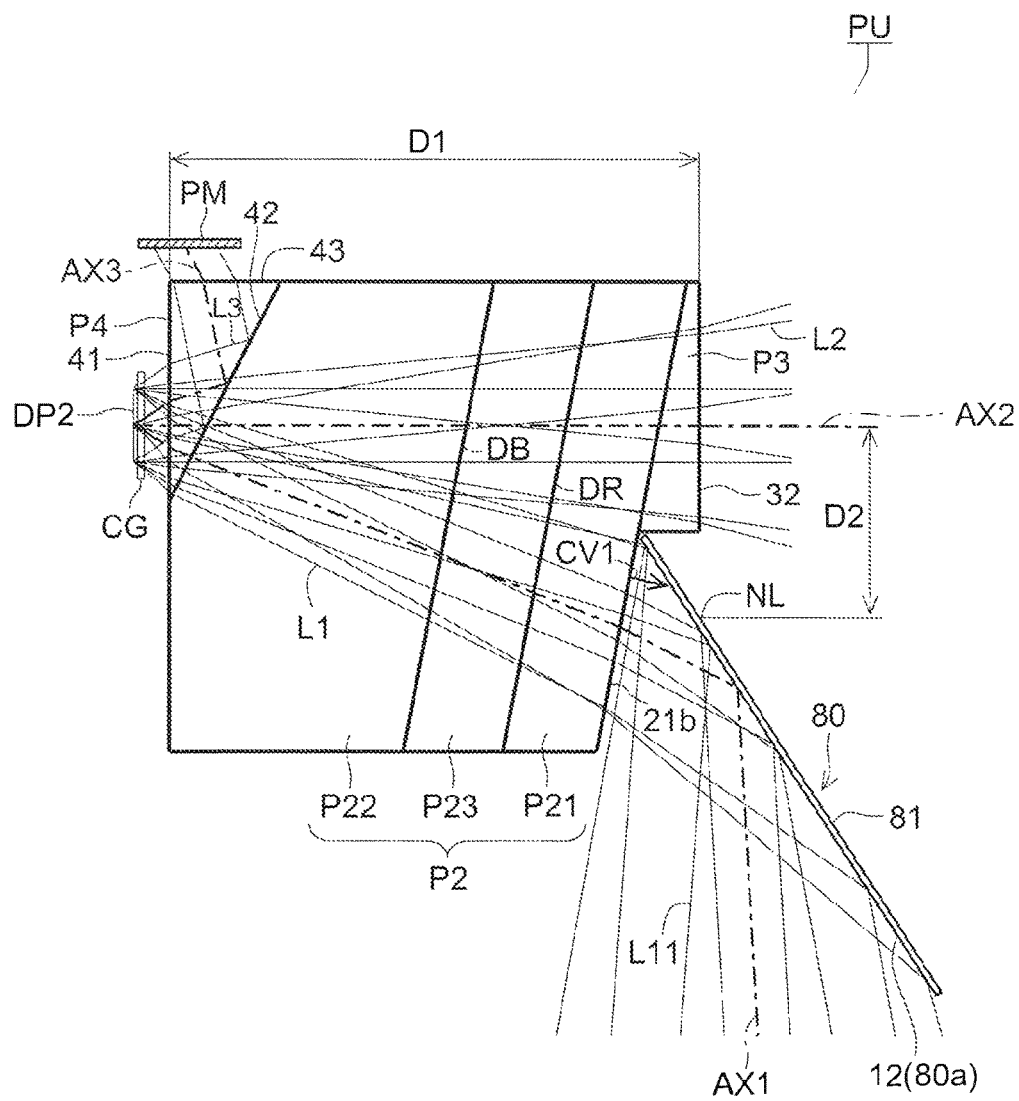
FIG. 21 is a side sectional view of the optical unit according to one or more embodiments of the present invention.
Figure 22:
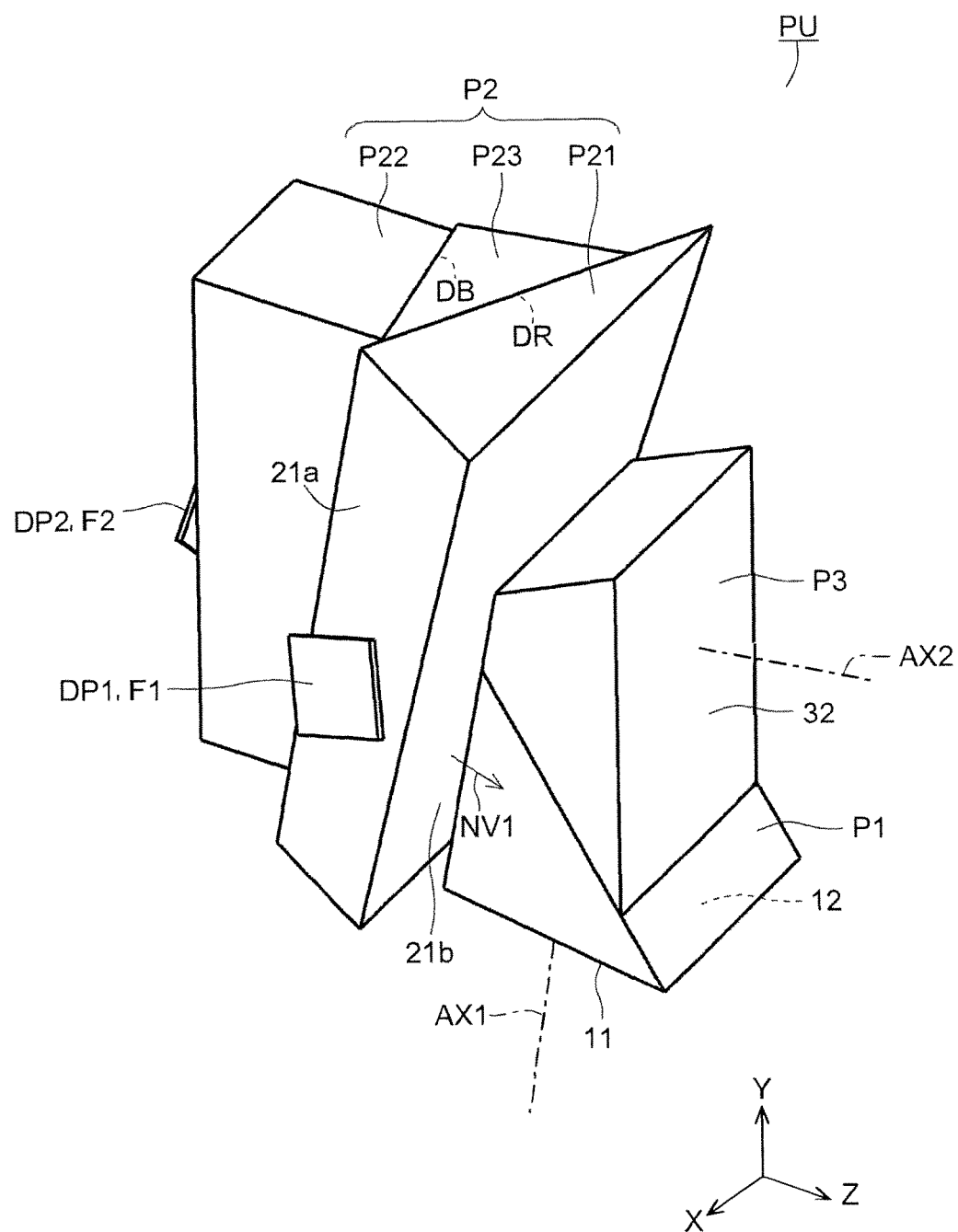
FIG. 22 is a perspective view of an optical unit according to one or more embodiments of the present invention.
Figure 23:
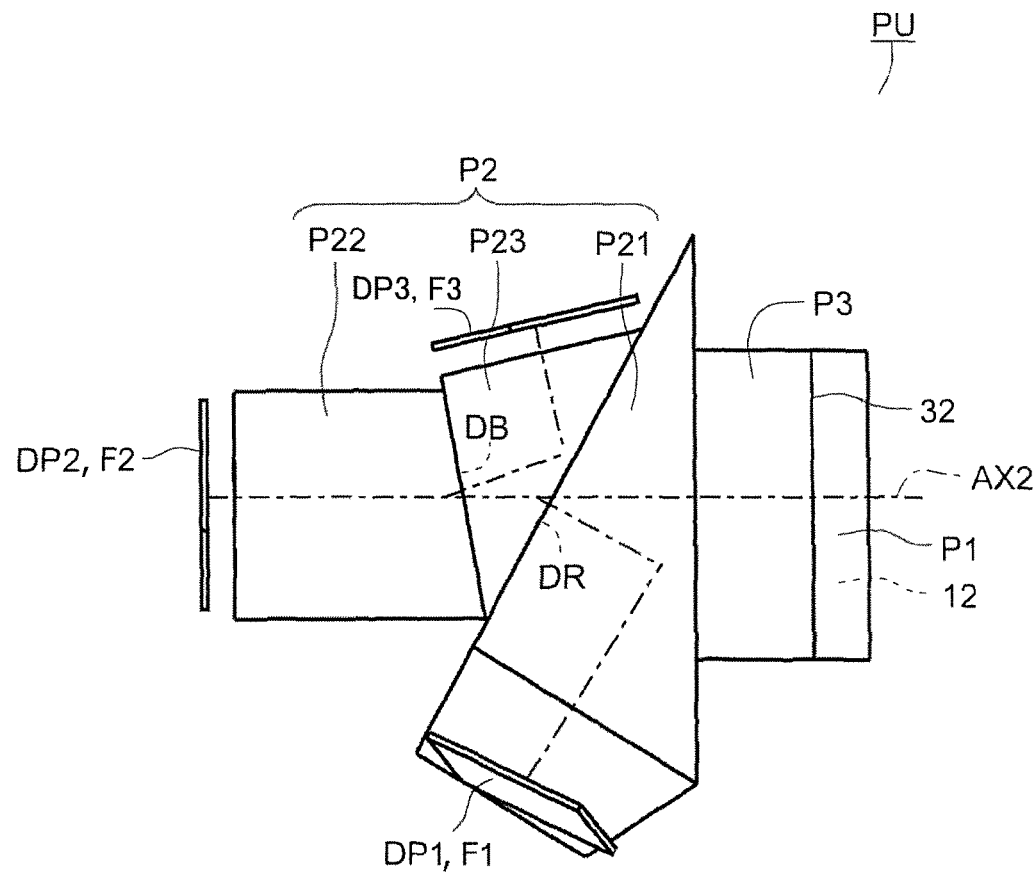
FIG. 23 is a top view of the optical unit according to one or more embodiments of the present invention.
Figure 24:
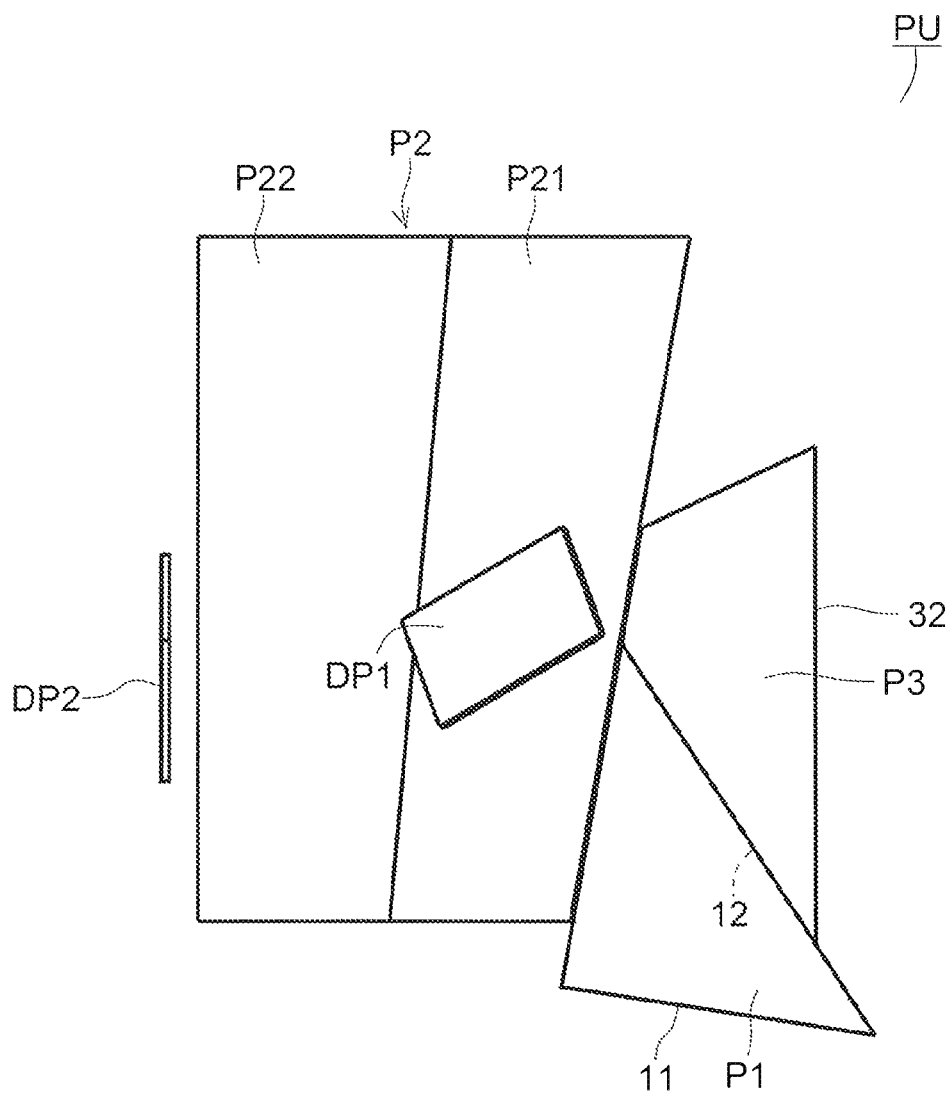
FIG. 24 is a side view of the optical unit according to one or more embodiments of the present invention.
Figure 25:
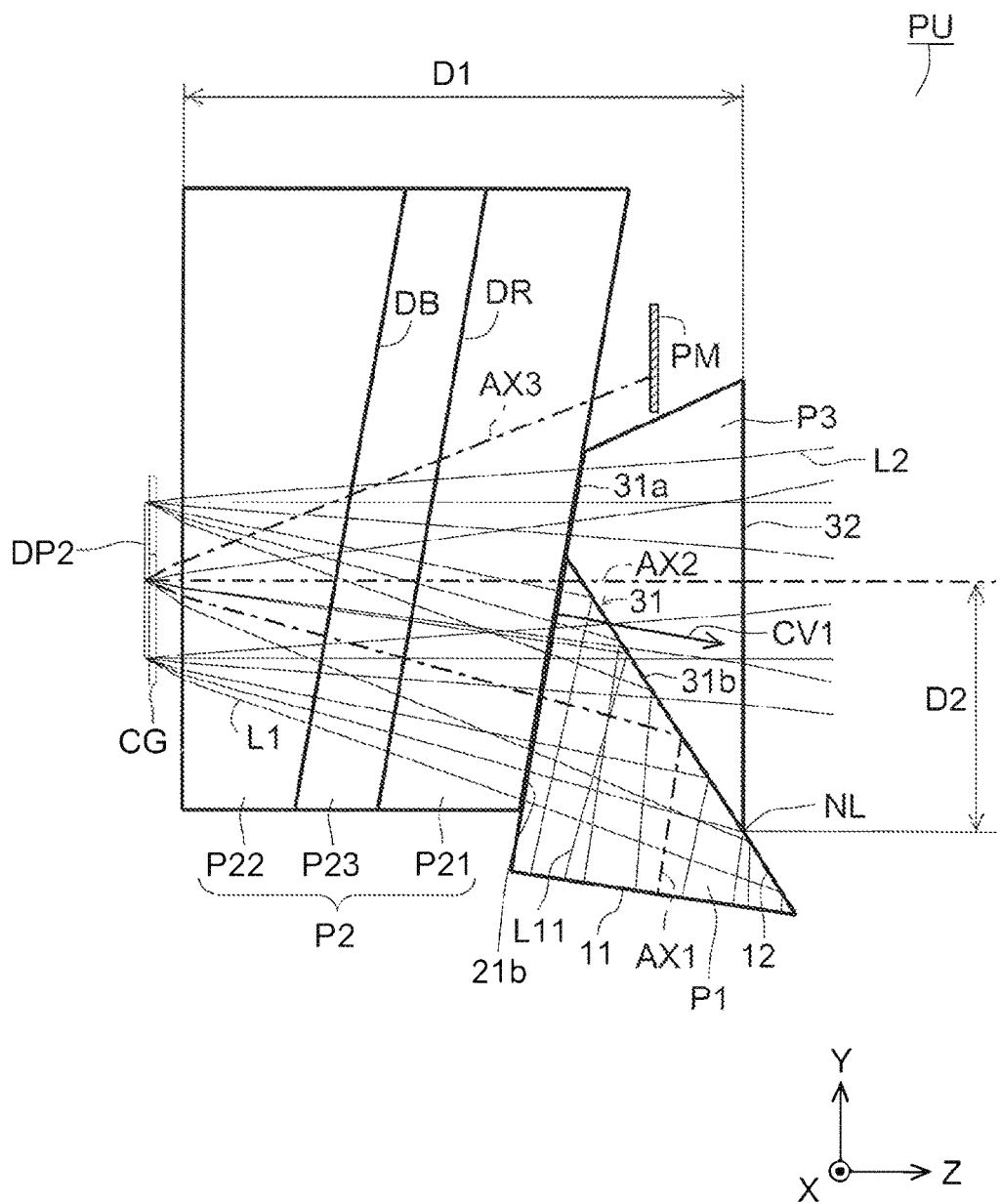
FIG. 25 is a side sectional view of the optical unit according to one or more embodiments of the present invention.

Next, one or more embodiments of the present invention will be described. FIGS. 19 to 21 are a perspective view, a side view, and a side sectional view, respectively, of an optical unit PU according to one or more embodiments. For convenience's sake, such parts as find their counterparts in one or more embodiments shown in FIGS. 1 to 9 are identified by common reference numerals. In one or more embodiments, the illumination light reflecting face 12 is structured differently than in one or more embodiments described above; otherwise, the structure here is similar to that in one or more embodiments described above.

The optical unit PU according to one or more embodiments includes, instead of an internal total reflection prism P1, a mirror member 80 (mirror or reflecting member) having a mirror face 80a formed on a glass substrate 81. The illumination light reflecting face 12 is constituted by the mirror face 80a. The mirror face 80a is formed by coating a high-precision polished glass substrate 81 with a metal (for example, aluminum or silver) or a dielectric multilayer film on a vacuum deposition machine.

In the projector PJ provided with the optical unit PU structured as described above, the white illumination light L1 emitted from the illumination optical system 2 strikes the mirror face 80a of the mirror member 80. The illumination light L1 striking the mirror face 80a is reflected on the mirror face 80a, and then enters the color-separating/integrating prism unit P2 via the entrance/exit face 21b. The operation thereafter of the projector PJ of one or more embodiments is similar to that in one or more embodiments described above.

Between the projector PJ employing the optical unit PU according to one or more embodiments and a projector employing an optical unit according to a comparative example, the up-down shift amount (Y-direction shift amount) of the projection optical system LN was compared. In the comparative example, as in the structure shown in FIG. 10, the entrance/exit face 21b of the prism P21 in the color-separating/integrating prism unit P2 is perpendicular to the optical axis AX2 of the color-integrated ON-light L2. In the comparative example, the projection-side prism P3 is omitted. Thus, the emergence face in one or more embodiments coincides with the exit face 32 of the projection-side prism P3, and the emergence face in the comparative example coincides with the entrance/exit face 21b of the prism P21. Otherwise, the comparative example was structured similarly to the optical unit PU according to one or more embodiments. The up-down shift amount was measured in a similar manner as in one or more embodiments described above. The Z-direction distance D1 between the entrance/exit face 41 facing the digital micromirror device DP2 and the exit face 32 is 85 mm in both one or more embodiments and the comparative example. The angle of inclination of the illumination light reflecting face 12 relative to the XZ plane is the same in one or more embodiments and the comparative example.

While the up-down shift amount of the projection optical system LN in the projector PJ employing the optical unit PU according to one or more embodiments was 30.4 mm, the up-down shift amount of the projection optical system in the projector employing the optical unit of the comparative example was 18.0 mm That is, the up-down shift amount when the optical unit PU according to one or more embodiments is used is 12.4 mm longer than that in the comparative example. Thus, the up-down shift amount of the projection optical system LN in the projector PJ provided with the optical unit PU according to one or more embodiments can be made longer than that in the comparative example. In one or more embodiments and the comparative example, the f-number of the illumination light L1 was approximately the same, and the luminance of the projected image was approximately the same.

Even when the illumination light reflecting face 12 is constituted by the mirror face 80a of the mirror member 80 as in one or more embodiments, it is possible to obtain similar effects as with one or more embodiments described above.

Next, one or more embodiments of the present invention will be described. FIGS. 22 to 25 are a perspective view, a top view, a side view, and a side sectional view, respectively, of an optical unit PU according to one or more embodiments. For convenience's sake, such parts as find their counterparts in one or more embodiments shown in FIGS. 1 to 9 are identified by common reference numerals. In one or more embodiments, the digital micromirror devices DP are structured differently than in tone or more embodiments described above; otherwise, the structure here is similar to that in one or more embodiments described above.

In one or more embodiments, the entrance face 31 of the projection-side prism P3 is composed of a face 31a that is located close to, so as to face, the entrance/exit face 21b and a face 31b that is located close to, so as to face, the illumination light reflecting face 12. The faces 31a and 31b abut each other in the Y direction. An internal total reflection prism P1-side end part of the exit face 21 is close to the illumination light reflecting face 12.

Figure 26:
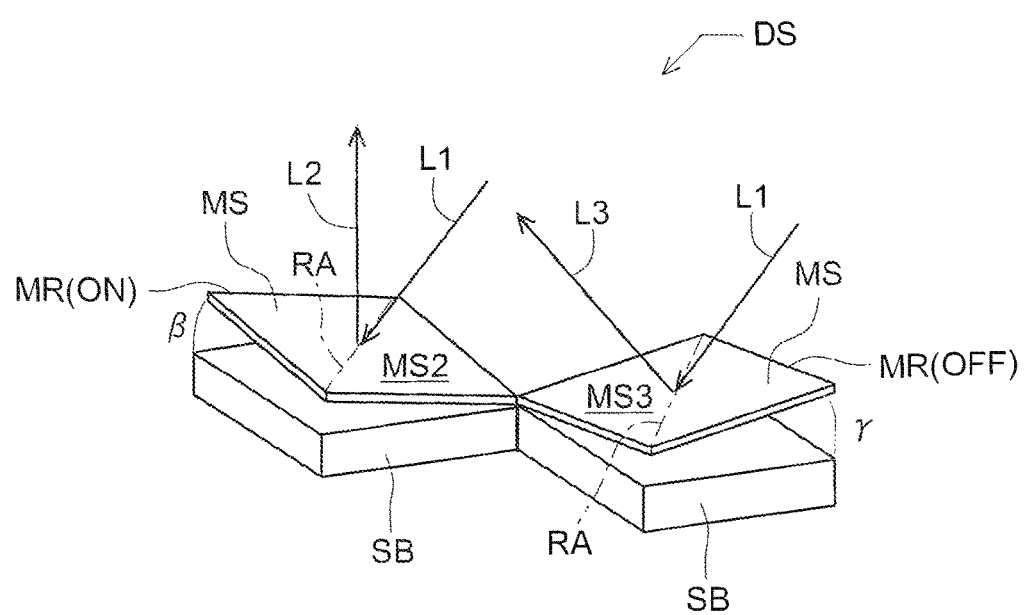
FIG. 26 is a perspective view illustrating the operation of a digital micromirror device in the optical unit according to one or more embodiments of the present invention.

FIG. 26 is a perspective view of micromirrors MR in ON and OFF states in a digital micromirror device DP in one or more embodiments. The digital micromirror devices DP in one or more embodiments differs, in that the micromirrors MR pivot about one pivot axis RA, from the digital micromirror devices DP in one or more embodiments described above, where the micromirrors MR pivot about two mutually perpendicular axes. Otherwise, the digital micromirror devices DP in one or more embodiments are similar to those in one or more embodiments described above.

The angles $\beta$ and $\gamma$ are each 12°. Thus, a micromirror MR pivots about the pivot axis RA from the reference state (the state where the direction normal to the micromirror MR coincides with the Z direction) through −12° to turn to the ON state or through +12° to turn to the OFF state. Thus, the digital micromirror devices DP express ON and OFF by driving the micromirrors MR with respect to one pivot axis RA. Near the digital micromirror devices DP, the optical axis AX1 of the illumination light L1, the optical axis AX2 of the ON-light L2, and the optical axis AX3 of the OFF-light L3 are disposed on the same plane.

In the projector PJ provided with the optical unit PU structured as described above, when white illumination light L1 is emitted from the illumination optical system 2, as in one or more embodiments described above, ON-light L2 (projection light) is emitted from the optical unit PU. Thus, a projected image is projected onto the screen SC.

At that time, part of the ON-light L2 leaving the entrance/exit face 21b of the prism P21 enters the internal total reflection prism P1 via the exit face 13, then passes through the illumination light reflecting face 12, and then enters the projection-side prism P3. Thereafter, the ON-light L2 exits via the exit face 32 of the projection-side prism P3.

In one or more embodiments and those described above, the angle θ (unillustrated) between the optical axis AX1 of the light striking the digital micromirror devices DP and the optical axis AX2 of the ON-light L2 (reflected light) reflected from micromirrors MR in the ON state is 34° and 24° respectively. That is, the angle θ in one or more embodiments is smaller than the angle θ in one or more embodiments described above. Accordingly, within the same distance D1 as in one or more embodiments described above, the ON-light L2 and the illumination light L1 cannot be separated from each other completely; thus, unlike in one or more embodiments described above, the ON-light L2 passes through the illumination light reflecting face 12.

On the other hand, the OFF-light L3 (unnecessary light) reflected from micromirrors MR in the OFF state in the digital micromirror devices DP1, DP2, and DP3 is discharged out of the optical unit PU via the top faces (end faces opposite from the entrance face 11 in the Y direction) and upper parts of the entrance/exit faces 21b of the prisms P21, P22, and P23.

Between the projector PJ employing the optical unit PU according to one or more embodiments and a projector employing an optical unit according to a comparative example, the up-down shift amount (Y-direction shift amount) of the projection optical system LN was compared. In the comparative example, as in the structure shown in FIG. 10, the entrance/exit face 21b of the prism P21 in the color-separating/integrating prism unit P2 is perpendicular to the optical axis AX2 of the color-integrated ON-light L2. In both one or more embodiments and the comparative example, the emergence face coincides with the exit face 32 of the projection-side prism P3. Otherwise, the comparative example was structured similarly to the optical unit PU according to one or more embodiments. The up-down shift amount was measured in a similar manner as in one or more embodiments. The Z-direction distance D1 between the entrance/exit face 41 facing the digital micromirror device DP2 and the exit face 32 is 86 mm in both one or more embodiments and the comparative example. The angle of inclination of the illumination light reflecting face 12 relative to the XZ plane is the same in one or more embodiments and the comparative example.

While the up-down shift amount of the projection optical system LN in the projector PJ according to one or more embodiments was 38.2 mm, the up-down shift amount of the projection optical system in the projector employing the optical unit of the comparative example was 25.1 mm That is, the up-down shift amount when the optical unit PU according to one or more embodiments is used is 13.1 mm longer than that in the comparative example. Thus, the up-down shift amount of the projection optical system LN in the projector PJ provided with the optical unit PU according to one or more embodiments can be made longer than that in the comparative example. In one or more embodiments and the comparative example, the f-number of the illumination light L1 was approximately the same, and the luminance of the projected image was approximately the same.

Also with one or more embodiments, it is possible to obtain similar effects as with one or more embodiments described above.

Figure 27:
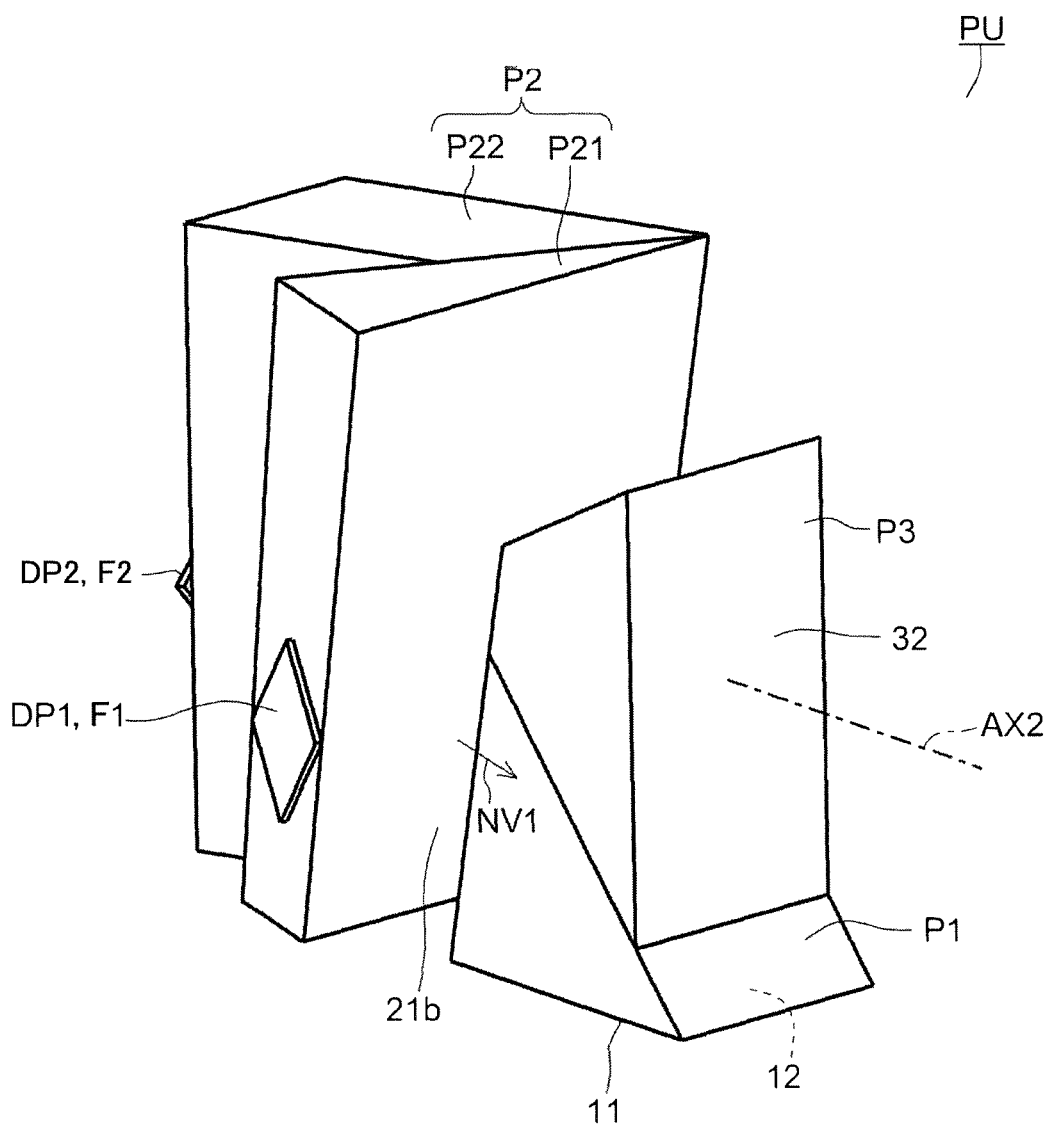
FIG. 27 is a perspective view of an optical unit according to one or more embodiments of the present invention.
Figure 28:
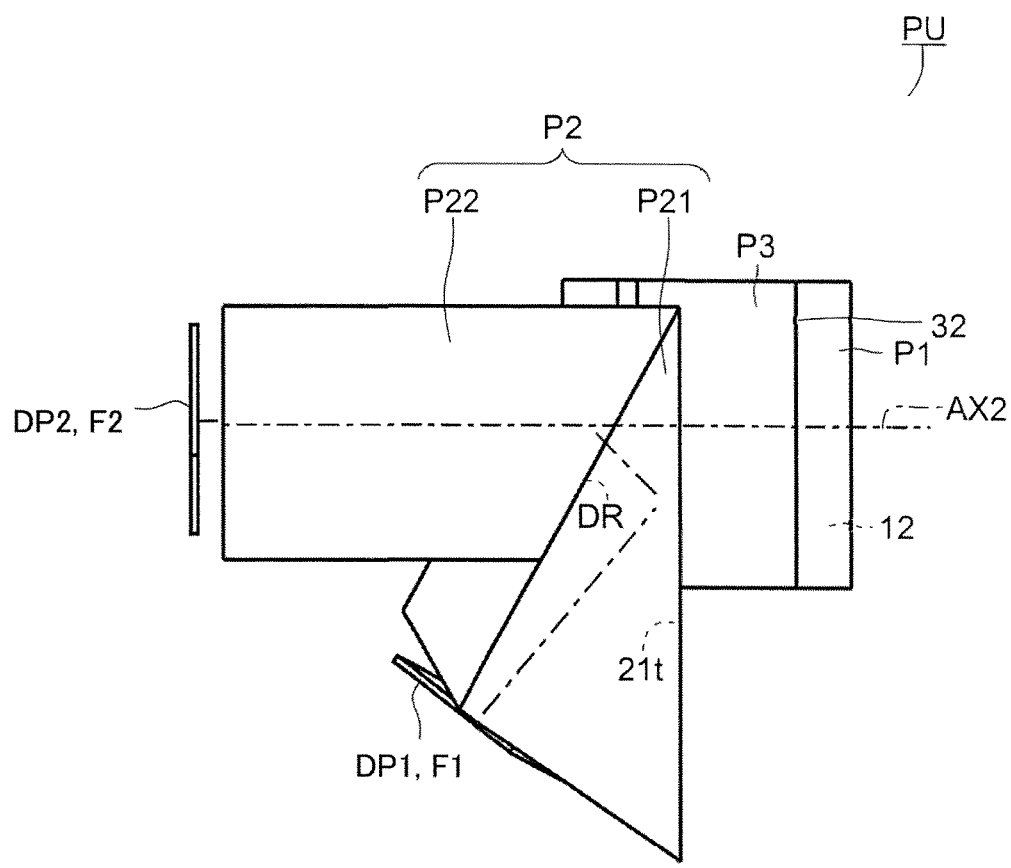
FIG. 28 is a top view of the optical unit according to one or more embodiments of the present invention.
Figure 29:
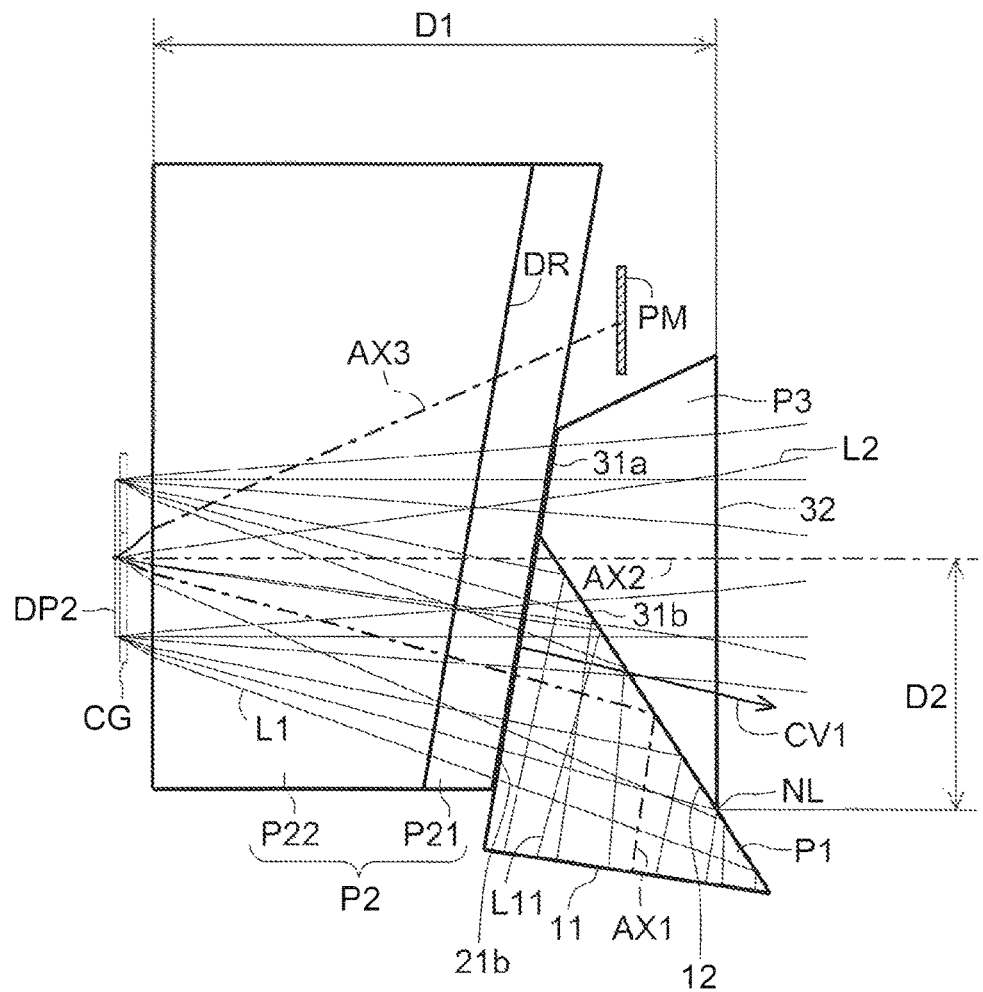
FIG. 29 is a side sectional view of the optical unit according to one or more embodiments of the present invention.

Next, one or more embodiments of the present invention will be described. FIGS. 27 to 29 are a perspective view, a top view, and a side sectional view, respectively, of an optical unit PU according to one or more embodiments. For convenience's sake, such parts as find their counterparts in one or more embodiments shown in FIGS. 22 to 26 are identified by common reference numerals. In one or more embodiments, the color-separating/integrating prism unit P2 is structured differently than in one or more embodiments described above; otherwise, the structure here is similar to that in one or more embodiments described above.

In one or more embodiments, the color-separating/integrating prism unit P2 is composed of prisms P21 and P22, and thus compared with the color-separating/integrating prism unit P2 in one or more embodiments described above, the prism P23 is omitted. As in one or more embodiments described above, the color-separated illumination light L1 is directed to the digital micromirror devices DP1 and DP2, and the color-integrated ON-light L2 exits via the exit face 32. Also in one or more embodiments, as in one or more embodiments described above, the ON-light L2 passes through the illumination light reflecting face 12.

Between the projector PJ employing the optical unit PU according to one or more embodiments and a projector employing an optical unit according to a comparative example, the up-down shift amount (Y-direction shift amount) of the projection optical system LN was compared. In the comparative example, as in the structure shown in FIG. 10, the entrance/exit face 21b of the prism P21 in the color-separating/integrating prism unit P2 is perpendicular to the optical axis AX2 of the color-integrated ON-light L2. In both one or more embodiments and the comparative example, the emergence face coincides with the exit face 32 of the projection-side prism P3. Otherwise, the comparative example was structured similarly to the optical unit PU according to one or more embodiments. The up-down shift amount was measured in a similar manner as in one or more embodiments described above. The Z-direction distance D1 between the entrance/exit face 41 facing the digital micromirror device DP2 and the exit face 32 is 86 mm in both one or more embodiments and the comparative example. The angle of inclination of the illumination light reflecting face 12 relative to the XZ plane is the same in one or more embodiments and the comparative example.

While the up-down shift amount of the projection optical system LN in the projector PJ employing the optical unit PU according to one or more embodiments was 38.2 mm, the up-down shift amount of the projection optical system in the projector employing the optical unit of the comparative example was 25.1 mm That is, the up-down shift amount when the optical unit PU according to one or more embodiments is used is 13.1 mm longer than that in the comparative example. Thus, the up-down shift amount of the projection optical system LN in the projector PJ provided with the optical unit PU according to one or more embodiments can be made longer than that in the comparative example. In one or more embodiments and the comparative example, the f-number of the illumination light L1 was approximately the same, and the luminance of the projected image was approximately the same.

Also with one or more embodiments, it is possible to obtain similar effects as with one or more embodiments described above.

One or more embodiments of the present invention find application in optical units that receive illumination light and emit projection light reflected from a digital micromirror device, and in projectors provided with such optical units. As will be understood from the above description, one or more embodiments described above encompass, among others, the following distinctive structures (#1) to (#14).

(#1) An optical unit in which illumination light is directed to a plurality of digital micromirror devices that produce projection light by modulating the illumination light on an image display surface according to an image signal so that the optical unit emits, by transmitting, the projection light produced by the plurality of digital micromirror devices includes: a reflecting member having an illumination light reflecting face on which the illumination light is reflected; and a prism unit composed of a plurality of first prisms, the illumination light reflected from the illumination light reflecting face entering via a first face of the most emergence-side first prism, the projection light exiting via the first face. The reflecting member is close to the first face and is disposed so as to protrude from the first face in the projection light exiting direction. The optical axis of the illumination light striking, as incident light, the illumination light reflecting face and the optical axis of the projection light on the first face are disposed on the same plane which is the optical axis plane. A first component vector that is obtained, when a first, outward, normal vector to the first face is projected onto the optical axis plane, by it being projected to be disposed on the same side as the optical axis of the incident light with respect to the optical axis of the projection light points in such a direction that, the farther away from the first face, the farther away from the optical axis of the projection light leaving the first face.

(#2) In the optical unit according to (#1), at least one of the first prisms has a dichroic coat face, and the prism unit performs color separation for the illumination light and color integration for the projection light.

(#3) In the optical unit according to (#1) or (#2), a second component vector that is obtained, when a second, inward, normal vector to an opposite face facing the first face of the first prism having the first face is projected onto the optical axis plane, by it being projected to be disposed on the same side as the optical axis of the incident light with respect to the optical axis of the projection light points in such a direction that, the farther away from the opposite face, the farther away from the optical axis of the projection light leaving the first face.

(#4) In the optical unit according to any one of (#1) to (#3), the illumination light reflecting face is disposed outside the beam of the projection light.

(#5) In the optical unit according to any one of (#1) to (#4), the reflecting member is an internal total reflection prism, and the illumination light reflecting face is constituted by a total reflection face in the internal total reflection prism.

(#6) In the optical unit according to any one of (#1) to (#4), the reflecting member is a mirror member, and the illumination light reflecting face is constituted by a mirror face in the mirror member.

(#7) In the optical unit according to any one of (#1) to (#6), there is further provided an emergence-side optical member having a second face, the optical axis of the projection light being disposed in a direction normal to the second face, the projection light emerging from the second face, the emergence-side optical member being disposed on the projection light exiting direction side of the first face. A prism unit-side end part of the beam of the illumination light on the illumination light reflecting face is disposed on the same side as the prism unit with respect to the second face, and the intersection line between the illumination light reflecting face and the second face is disposed outside the beam of the projection light on the second face.

(#8) In the optical unit according to (#7), the emergence-side optical member is a second prism, the projection light entering via an entrance face thereof facing the first face, the projection light exiting via the second face.

(#9) In the optical unit according to any one of (#1) to (#8), there are further provided a plurality of fitting portions F1, F2, F3 to which the digital micromirror devices are fitted. The fitting portions F1, F2, F3 are disposed so as to correspond to the first prisms respectively, and the digital micromirror devices form an image through intensity modulation on the illumination light through ON/OFF control of the inclination of the faces of a plurality of micromirrors that pivot about a pivot axis.

(#10) In the optical unit according to (#9), the micromirrors each have, as the pivot axis, two mutually perpendicular pivot axes, and the driving of the individual micromirrors is performed with respect to the two pivot axes. The plane that includes the optical axis of the projection light leaving the first face and that passes through the center of one of the digital micromirror devices in its longer-side direction and runs parallel to its shorter-side direction is perpendicular to the illumination light reflecting face.

(#11) In the optical unit according to (#10), there are further provided third prisms disposed between the digital micromirror devices and the first prisms respectively. The third prisms each have an OFF-light reflecting face that transmits, as the projection light, ON-light reflected from micromirrors in an ON state in the digital micromirror devices and that reflects, as unnecessary light, OFF-light reflected from micromirrors in an OFF state in the digital micromirror devices.

(#12) In the optical unit according to (#11), conditional formula (1) below is fulfilled:

$$\theta_{OFF} > \sin^{-1}(1/n) > \theta_{ON} \tag{1}$$

where $\theta_{ON}$ represents the angle of incidence of the ray of the ON-light with the largest angle of incidence with respect to the OFF-light reflecting face;

$\theta_{OFF}$ represents the angle of incidence of the ray of the OFF-light with the smallest angle of incidence with respect to the OFF-light reflecting face; and n represents the index of refraction of the third prisms.

(#13) A projector includes an optical unit according to any one of (#9) to (#12); a light source; an illumination optical system that emits illumination light toward the reflecting member in the optical unit; and a projection optical system that projects onto a screen, on an enlarged scale, the image displayed on the digital micromirror devices fitted to the fitting portions F1, F2, F3.

(#14) In the projector of according to (#13), the projection optical system is disposed to face the first face in the optical unit, the reflecting member is disposed below the optical axis of the projection light leaving the first face, and the projection optical system is movable the an up-down direction.

According to the optical unit structured as described above, the optical axis of the illumination light striking, as incident light, the illumination light reflecting face and the optical axis of the projection light on the first face are disposed on the same plane which is the optical axis plane. A first component vector that is obtained, when a first, outward, normal vector to the first face is projected onto the optical axis plane, by it being projected to be disposed on the same side as the optical axis of the incident light with respect to the optical axis of the projection light points in such a direction that, the farther away from the first face, the farther away from the optical axis of the projection light leaving the first face. It is thus possible, while preventing a drop in the amount of light in the illumination light totally reflected on the illumination light reflecting face, to increase the distance between the optical axis of the projection light near the first face leaving the first face and the reflecting member in the direction perpendicular to the optical axis of the projection light. Thus, in a case where the projection optical system is disposed to face the first face in the optical unit, the shift amount of the projection optical system in the direction toward the reflecting member can be increased. It is thus possible, while preventing a drop in the amount of projection light, to enhance the usability of the optical unit and the projector.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical unit in which an illumination light is directed to a plurality of digital micromirror devices that produce projection light by modulating the illumination light on an image display surface according to an image signal, wherein the optical unit emits the projection light produced by the digital micromirror devices, the optical unit comprising:

a reflector having an illumination light reflecting face on which the illumination light is reflected; and a prism unit composed of a plurality of first prisms, wherein the reflected illumination light enters the prism unit via a first face of a most emergence-side first prism among the first prisms and the projection light exits via the first face, wherein the reflector is disposed next to the first face and protrudes from the first face in a projection light exiting direction, an optical axis of the illumination light striking, as incident light, the illumination light reflecting face and an optical axis of the projection light on the first face are on a same plane, wherein the same plane is an optical axis plane, when a first outward normal vector to the first face is projected onto the optical axis plane, a first component vector is obtained by the first outward normal vector being projected on a same side as the optical axis of the incident light with respect to the optical axis of the projection light, and the first component vector points in a direction along which the farther away the first component vector is from the first face, the farther away the first component vector is from the optical axis of the projection light leaving the first face.

2. The optical unit according to claim 1, wherein at least one of the first prisms has a dichroic coat face, and the prism unit executes color separation for the illumination light and color integration for the projection light.

3. The optical unit according to claim 1, wherein when a second inward normal vector to an opposite face facing the first face of the first prism is projected onto the optical axis plane, a second component vector is obtained by the second inward normal vector being projected on the same side as the optical axis of the incident light with respect to the optical axis of the projection light, and the second component vector points in a direction along which the farther away the second component vector is from the opposite face, the farther away the second component vector is from the optical axis of the projection light leaving the first face.

4. The optical unit according to claim 1, wherein the illumination light reflecting face is disposed outside a beam of the projection light.

5. The optical unit according to claim 1, wherein the reflector is an internal total reflection prism, and the illumination light reflecting face is a total reflection face in the internal total reflection prism.

6. The optical unit according to claim 1, wherein the reflector is a mirror, and the illumination light reflecting face is a mirror face in the mirror.

7. The optical unit according to claim 1, further comprising:
an emergence-side optic having a second face, wherein the optical axis of the projection light is in a direction normal to the second face, the projection light emerges from the second face, and the emergence-side optic is disposed on a projection light exiting direction side of the first face,
wherein
a prism unit-side end part of a beam of the illumination light on the illumination light reflecting face is disposed on a same side as the prism unit with respect to the second face, and
an intersection line between the illumination light reflecting face and the second face is outside the beam of the projection light on the second face.

8. The optical unit according to claim 7, wherein the emergence-side optic is a second prism,
the projection light enters the second prism via an entrance face of the second prism facing the first face, and
the projection light exits the second prism via the second face.

9. The optical unit according to claim 1, further comprising:
a plurality of fitting portions to which the digital micromirror devices are fitted, wherein
the fitting portions are disposed to correspond to the first prisms respectively, and
the digital micromirror devices form an image through intensity modulation on the illumination light through ON/OFF control of inclination of faces of a plurality of micromirrors that pivot about a pivot axis.

10. The optical unit according to claim 9, wherein the micromirrors each have, as the pivot axis, two mutually perpendicular pivot axes,
each of the micromirrors is driven with respect to the two pivot axes, and
a plane perpendicular to the illumination light reflecting face:
includes the optical axis of the projection light leaving the first face,
passes through a center of one of the digital micromirror devices in a longer-side direction, and
runs parallel to a shorter-side direction.

11. The optical unit according to claim 10, further comprising:
third prisms disposed between the digital micromirror devices and the first prisms respectively,
wherein
the third prisms each have an OFF-light reflecting face that transmits, as the projection light, ON-light reflected from the micromirrors in an ON state in the digital micromirror devices and that reflects, as unnecessary light, OFF-light reflected from the micromirrors in an OFF state in the digital micromirror devices.

12. The optical unit according to claim 11, wherein conditional formula (1) below is fulfilled:

$$\theta_{OFF} > \sin^{-1}(1/n) > \theta_{ON} \quad (1)$$

where
$\theta_{ON}$ represents an angle of incidence of a ray of the ON-light with a largest angle of incidence with respect to the OFF-light reflecting face;
$\theta_{OFF}$ represents an angle of incidence of a ray of the OFF-light with a smallest angle of incidence with respect to the OFF-light reflecting face; and
n represents an index of refraction of the third prisms.

13. A projector comprising:
the optical unit according to claim 9;
a light source;
an illumination optical system that emits an illumination light toward the reflector in the optical unit; and
a projection optical system that projects onto a screen, on an enlarged scale, the image displayed on the digital micromirror devices fitted to the fitting portions.

14. The projector according to claim 13, wherein the projection optical system is disposed to face the first face in the optical unit,
the reflector is disposed below the optical axis of the projection light leaving the first face, and
the projection optical system is movable in an up-down direction.

* * * * *